US012810522B1

(12) United States Patent
Blaes et al.

(10) Patent No.: US 12,810,522 B1
(45) Date of Patent: Nov. 24, 2026

(54) SENSOR DATA MACHINE-LEARNED FEATURE FUSION INTO HETEROGENOUS DATA STRUCTURE

(71) Applicant: Zoox, Inc., Foster City, CA (US)

(72) Inventors: Patrick Blaes, Redwood City, CA (US); Arthur Daniel Costea, Foster City, CA (US); David Pfeiffer, Foster City, CA (US); Adam Edward Pollack, Ramsey, NJ (US); Rajendramayavan Rajendran Sathyam, Foster City, CA (US); Jackson Owen Waschura, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 207 days.

(21) Appl. No.: 18/759,507

(22) Filed: Jun. 28, 2024

(51) Int. Cl.

| | |
|---|---|
| ***G06T 15/00*** | (2011.01) |
| ***B60W 60/00*** | (2020.01) |
| ***G01S 17/89*** | (2020.01) |
| ***G06T 7/20*** | (2017.01) |
| ***G06T 7/50*** | (2017.01) |
| ***G06V 10/44*** | (2022.01) |

(52) U.S. Cl.
CPC ........... *G06T 15/00* (2013.01); *B60W 60/001* (2020.02); *G01S 17/89* (2013.01); *G06T 7/20* (2013.01); *G06T 7/50* (2017.01); *G06V 10/44* (2022.01); *G06V 2201/07* (2022.01)

(58) Field of Classification Search
CPC ........ G06T 15/00; G06T 7/50; G06V 2201/07
See application file for complete search history.

(56) References Cited

U.S. PATENT DOCUMENTS

| | | | | |
|---|---|---|---|---|
| 11,227,401 | B1 * | 1/2022 | Mahieu | G01S 17/89 |
| 2019/0138029 | A1 * | 5/2019 | Ryll | G06T 7/73 |
| 2024/0157979 | A1 * | 5/2024 | Jiang | B60W 50/0097 |
| 2024/0312218 | A1 * | 9/2024 | Krehl | G01S 13/931 |
| 2025/0111528 | A1 * | 4/2025 | Xu | G06V 20/58 |
| 2025/0157178 | A1 * | 5/2025 | Ravi Kumar | G06V 20/56 |
| 2025/0285377 | A1 * | 9/2025 | Khorramshahi | G06T 17/00 |

* cited by examiner

*Primary Examiner* — Daniel F Hajnik
*Assistant Examiner* — Sarah Yeo Lee
(74) *Attorney, Agent, or Firm* — Lee & Hayes, P.C.

(57) ABSTRACT

Detecting, tracking, and/or predicting a future state of an object may be accomplished by one or more machine-learned models that use a data structure generated using sensor data received by a vehicle. The data structure may comprise a voxel grid portion and an image with polar, cylindrical, or other coordinates that indicate regions of the image that surround a vehicle where the regions may have an infinite or undefined range. The voxel grid and image of the data structure may be populated with feature representations determined by a set of machine-learned model using multiple types of sensor data.

20 Claims, 7 Drawing Sheets

SENSOR DATA MACHINE-LEARNED FEATURE FUSION INTO HETEROGENOUS DATA STRUCTURE

BACKGROUND

Autonomous vehicles may use sensors to capture data regarding an environment through which the autonomous vehicles traverse. Since autonomous vehicles may include two or more different types of sensors and the sensor data may widely vary in its format and what different sensors can detect or may be obstructed by, the detections generated by two different sensor types may differ and such discrepancies may make it difficult to track objects and/or determine which different sensor data corresponds to a same portion of an object. Moreover, a particular type of sensor data may fail to include enough data to reliably control an autonomous vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 2 also includes an illustration of example object detections generated using the raw sensor data.

DETAILED DESCRIPTION

Figure 1:
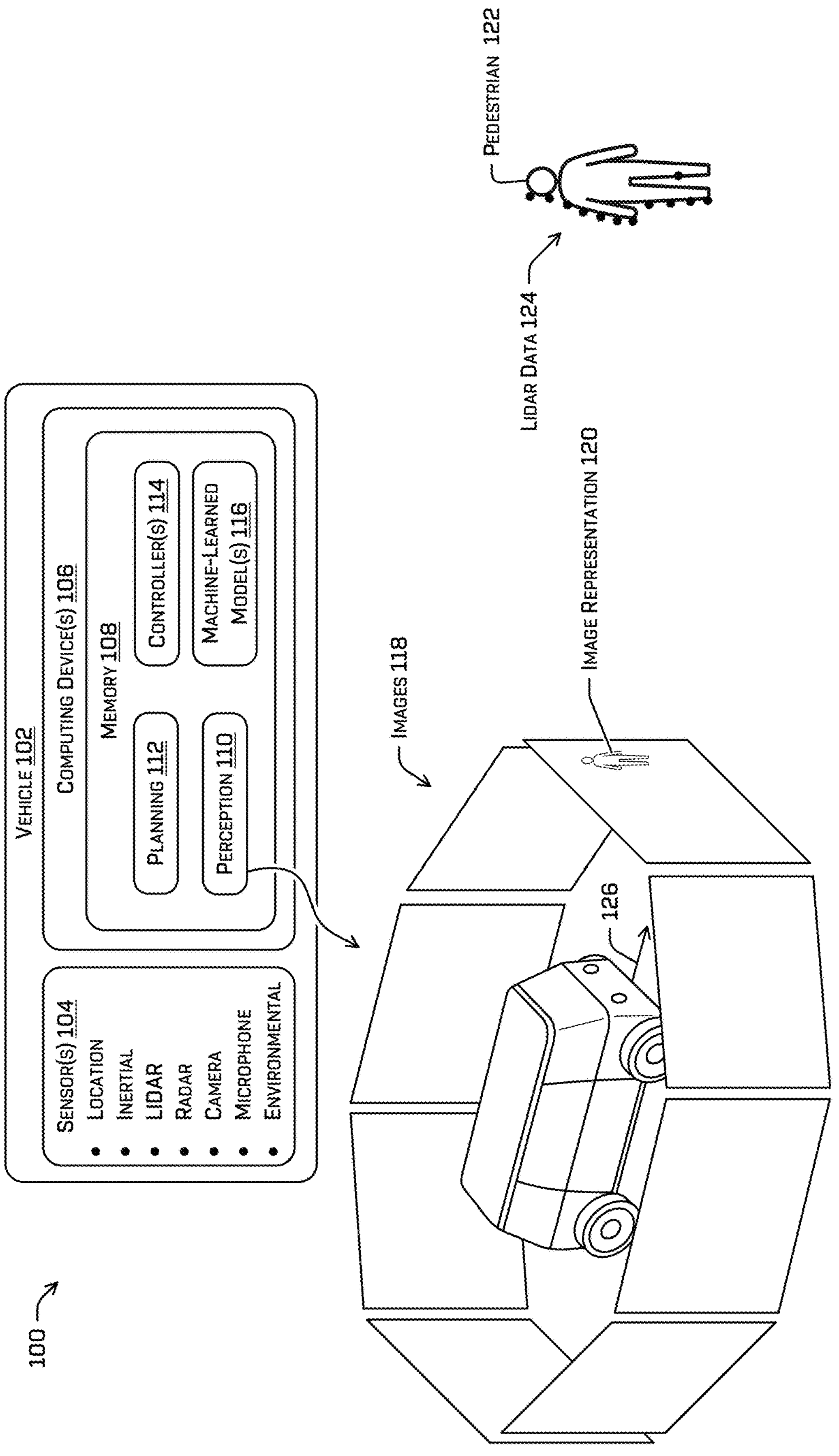
FIG. 1 illustrates an example scenario including an autonomous vehicle that collects sensor data as it operates in an environment.

Techniques for detecting and/or tracking a current and/or previous position and/or heading (i.e. pose), velocity, acceleration, and/or or the like of an object using sensor data may comprise generating a data structure using sensor data received at a vehicle and using the data structure as input to a machine-learned model trained to use the data structure as input. The sensor data may be received from two or more sensors and may additionally or alternatively comprise sensor data received from different types of sensors (e.g., RGB camera, infrared camera, grayscale camera, lidar sensor, radar sensor, time-of-flight (ToF) sensor).

In some examples, the data structure may comprise at least a voxel grid that stores feature representations generated using the sensor data. In additional or alternate examples, the data structure may additionally or alternatively comprise the voxel grid and an external portion of the data structure. In such an example, the voxel grid may store feature representations for sensor data within boundaries of the voxel grid, whereas the external portion of the data structure may store feature representations of sensor data beyond the voxel grid and/or an aggregation of the feature representations within the voxel grid.

A feature representation may comprise an embedding (e.g., a vector or tensor) determined by a machine-learned model based at least in part on a subset of sensor data. For example, the techniques described herein may comprise pre-generating, e.g., via ray casting, a set of rays (e.g., lines) from each sensor and may determine, for a particular line or ray, a portion of sensor data that line/ray intersects. To give a simple example, if the sensor data comprises an image from a camera, pre-generation may comprise determining a set of rays projecting from a sensor of the camera and an area bounded by the frustum of the camera. The techniques may comprise determining a pixel of the image that one of these rays intersects. A machine-learned model may determine a feature representation using that pixel's image data, other sensor data related to that pixel (e.g., lidar data and/or radar data that is associated with the pixel and/or context window by virtue of a determination that a projection of such lidar data and/or radar data into the image space is contained by the pixel and/or context window) and/or the ray, and/or image data and/or other data associated with other pixels within a context window around the pixel (e.g., within a threshold distance of the pixel). The feature representation determined by the machine-learned model may be associated with a set of voxels of the voxel grid. This set of voxels may comprise all the voxels the ray intersects, a voxel associated with a depth estimate determined for the pixel, or a subset of voxels that the ray intersects or that are within a threshold distance of a tangent of the ray.

For example, the techniques may comprise determining the set of voxels with which to associate a feature representation generated based on the pixel and/or context window of pixels (and/or other sensor data, such as lidar data and/or radar data) based at least in part on determining a depth estimate associated with the pixel at the center of the context window. This depth estimate may be determined by projecting lidar data into the two-dimensional image to determine lidar point(s) that are associated with the pixel and determining an average depth indicated by those lidar point(s) and/or a confidence interval associated with the lidar point(s) based on the variance of depths indicated by the lidar point(s). This average depth may be used to determine the voxel along the ray that is associated with that depth along the ray. Where multiple lidar point(s) aren't available to determine a confidence/confidence interval associated with this depth estimate, a separate machine-learned model may determine the depth estimate for monocular vision images, such as the machine-learned model discussed in U.S. Pat. No. 11,062,454, filed Apr. 16, 2019, the entirety of which is incorporated herein for all purposes. Additionally or alternatively, the machine-learned model may determine a two-dimensional or three-dimensional probability distribution along the ray that intersects the pixel indicating probabilities that the depth estimate is correct. Additionally or alternatively, if the pixel is associated with a portion of the camera's frustum that overlaps another camera's frustum, stereo vision may be used to determine the depth estimate and/or confidence interval associated therewith.

Regardless, the set of voxels with which the feature representation is to be associated may be determined by determining one or more voxels within a threshold distance of the pixel associated with the depth estimate, associated with a confidence interval, or associated with a probability indicated by the probability distribution that meets or exceeds a threshold probability. Additionally or alternatively, the set of voxels may comprise a minimum number of voxels on either side of the ray from the voxel associated with the depth estimate.

In some examples, the feature representation ultimately associated with a voxel may be a final feature representation that may be determined based at least in part on multiple feature representations, such as in examples where feature representations are generated for each type of sensor data received (e.g., RGB image, infrared image, lidar, radar), the voxel has multiple rays that intersect the voxel (e.g., due to sensors being located in different positions on the vehicle, due sensors of different types covering the area associated with the voxel), the voxel being part of multiple sets of voxels determined as discussed above, and/or the like. Additionally or alternatively, a feature representation may be determined for multiple types of sensor data (e.g., visible light, infrared, lidar, radar), in addition to or instead of determining a feature representation per type of sensor data. Accordingly, the feature representations determined by machine-learned model(s) trained to use the different types of sensor data as input may be amalgamated by concatenation, summation, averaging, or by another machine-learned model (e.g., a transformer, a multi-layer perceptron) that determines the final feature representation using the multiple feature representations associated with the voxel according to the techniques discussed herein.

In some examples, this process may be repeated for up to each ray that is predetermined for each sensor associated with the vehicle to populate as many voxels of the voxel grid as are intersected by rays and/or that are within a threshold distance of a ray (along the ray or tangent to the ray) or within a probability distribution associated with a ray and depth estimate and have a probability greater than a threshold probability. In some examples, this population of the voxel grid may comprise one part of generating the data structure and populating an exterior portion of the data structure may comprise a second part of generating the data structure that may be accomplished in parallel with completion of remaining portions of the voxel grid. For example, the voxel grid may be generated for rays within a yaw angle range and, once that is complete, rays within a next yaw angle range may be generated. While the rays of the next yaw angle range are being generated, an example process may comprise generating an exterior portion of the data structure using the rays determined for the previous yaw angle range. This could similarly or alternatively be completed based on height range (in a cylindrical data structure example) or pitch angle range (in a spherical/polar data structure example).

The techniques may additionally or alternatively comprise determining an aggregated feature representation to associate with an exterior portion of the data structure. For example, the data structure may comprise a voxel grid and an exterior portion that may indicate aggregated feature representations indexed using polar (spherical), cylindrical, or any other coordinates. In some examples, an origin of the exterior portion may be centered at a center of vehicle, a center of mass of the vehicle, or the like. The exterior portion may indicate an aggregation of the feature representations indicated in the voxel grid and/or feature representation(s) of sensor data that is indicated to be beyond the voxel grid (e.g., lidar or radar data indicating a distance from the vehicle that is beyond a boundary of the voxel grid) or for which no depth estimate was determined (e.g., image data for which no estimated depth was determined). Determining the exterior portion may comprise determining a yaw angle and height or range of yaw angles and heights (for a cylindrical exterior portion), or a yaw angle and pitch angle or range of yaw angles and pitch angles (for a polar/spherical exterior portion) for a ray (or area or volume around a ray, e.g., that may defined by threshold distance(s) tangent from the ray) that intersects the respective coordinates. The radius for either a cylindrical exterior portion or spherical exterior portion may be infinite, undefined, or indicated to be a radius that meets or exceeds a maximum range of a sensor of the vehicle (e.g., a maximum effective, i.e., reliable/accuracy meeting and/or exceeding a threshold accuracy, distance at which a longest range sensor performs).

Any sensor data along the ray or contained within the volume around the ray for which a feature representation has not already been generated may be provided as input to a machine-learned model of that sensor's type to determine a feature representation for that sensor data. This may occur in cases where the sensor data indicates a distance from the sensor that is beyond a boundary of the voxel grid or for which no depth estimate was determined as part of generating the voxel grid, for example. The feature representations generated for this sensor data and the feature representations indicated by any intervening voxels of the voxel grid associated with this ray or volume around the ray may be aggregated, such as by concatenating or summing those feature representations or determining the aggregated feature representation by a machine-learned model that uses those feature representations as input. Additionally or alternatively, feature representations associated with another ray that intersects the same area of the external portion intersected by the first ray may be aggregated in a similar manner with the feature representations associated with the first ray.

Ultimately, the techniques discussed herein may comprise determining, according to the ray casting technique discussed above, feature representations (e.g., embeddings) for multiple sensors' sensor data (e.g., where there may be multiple types of sensors in some examples) that are used to generate and populate a voxel grid. Additionally or alternatively, the data structure may comprise an exterior portion that is populated with aggregated feature representations comprising an aggregation of any intervening feature vector(s)' feature representation(s) and feature vector(s) for any sensor data beyond the voxel grid or for which no depth estimate was determined along ray(s) from the sensor(s) of the vehicle. Again, these rays may be bounded by a frustum of the sensor. In some examples, the exterior portion may be represented as an image where a pixel thereof indicates a feature vector instead of color and intensity of light and where the image indicates a 360 degree feature representation of the environment of the vehicle. In some examples, the voxel grid may have a boundary that is 50-75 meters from the vehicle and any sensor data beyond that boundary and/or the feature representations of the voxel grid may be aggregated in the exterior portion, which may represent any sensor data that lies beyond the boundary of the voxel grid (and, in some examples, may also include an aggregation of any feature representations indicated in the voxel grid along ray(s) that intersect a particular part of the exterior portion).

In some examples, a perception component of a vehicle may use such a data structure to detect and/or track an object. For example, the perception component may comprise one or more machine-learned model trained to use the data structure as input and to determine region of interest (ROI) (e.g., a bounding volume, a bounding polygon), a semantic segmentation and/or instance segmentation of sensor data associated with the object, position and/or orientation, velocity and/or acceleration (e.g., longitudinal, lateral, angular), classification (e.g., pedestrian, cyclist, passenger vehicle, oversized vehicle, delivery vehicle, signage, building), and/or the like. The perception component may additionally or alternatively use a series of these data structures to generate such object detections and determine which object detections are associated with a same object, as a track of the object. In some examples, the object track may indicate that different object detections are associated with a same object and may, accordingly indicate current and/or historical object detection data related to the object.

In some examples, the object detection and/or track may be added to the data structure discussed herein, either by appending the raw object detection and/or track data with a respective portion of the data structure (e.g., a set of voxels of the voxel grid associated with the space occupied by the object and a part of the exterior portion associated with the object's profile). Additionally or alternatively, the object detection may be added to the data structure as a feature representation determined by a machine-learned model that may be concatenated, summed, averaged, or fused with the feature representation indicated by a voxel or part of the exterior portion by determining a new feature representation using the object detection/track feature representation and the current feature representation indicated by the voxel or part of the exterior portion.

Additionally or alternatively, the raw sensor data may be provided to the perception component before, during, after, or as part of generating the data structure. In such an example, the perception component may determine the object detection and/or track using the raw sensor data and a feature representation of that object detection may be mapped to the voxel grid and/or exterior portion and used in conjunction with the raw sensor data's feature representations using the ray casting technique described above to determine the final feature representation for populating a voxel and/or an aggregated feature representation for a part of the exterior portion.

In some examples, the machine-learned model(s) discussed herein for determining the feature representations may comprise neural networks, transformer encoder(s), and/or the like for determining an embedding (e.g., a vector or tensor). In some examples, different machine-learned model(s) may be trained per sensor type or a single machine-learned model may be trained to output such an embedding using sensor data from multiple sensor type(s). Regardless, the machine-learned model(s) may be pre-trained, such as by using reconstruction training, which doesn't require ground truth data, or by using ground truth labelling of the data structure or of the input sensor data to train the model. In an example using reconstruction training, the machine-learned model(s) may include an encoder that determines an embedding for the sensor data or a subset of the sensor data associated with a particular sensor type and a decoder determines a reconstruction (predicted estimate) of the original data input into the encoder. The training may comprise determining a loss based at least in part on a difference between the reconstruction and the original sensor data and using the loss, as part of gradient descent and backpropagating the loss, to alter parameter(s) of the encoder and the decoder to reduce the loss. The decoder may be removed after training is complete, e.g., when the average loss of the last n (a positive integer) losses is below a threshold loss, a number of epochs or batches is complete, or the losses otherwise indicate diminishing returns, and the encoder may be used to determine the feature representation(s) discussed herein.

In some examples, pre-training the machine-learned model(s) using a reconstruction loss may additionally or alternatively comprise masking a portion of the input data, such as by filling a percentage of the perception data and/or the map data with nonce data (e.g., 0, removing a portion of the input entirely), which may result in training the decoder to reconstruct the entire input data, including the masked portion, and may increase the robustness of the embedding(s) generated by the encoder in capturing salient information in the sensor data. In some examples, the percentage of the input data that is masked may start at zero or a small percentage and may progressively increase per batch of training or once the average reconstruction loss per batch is below a threshold loss. Ultimately, the reconstruction loss may help tune the embeddings generated by the encoder to be located in the embedding space such that the decoder is capable of distinguishing between different scenarios and accurately reproducing them.

In an example that uses ground truth data, a neural network or other encoder may determine the embedding and an object detection component may determine an object detection based at least in part on the embedding. This object detection may be generated either in a sensor data space such as in two-dimensions for an image or three-dimensions for lidar data or in the data structure space (e.g., which may include associating the object detection with voxel(s) and/or part of the exterior portion of the data structure). Ground truth data labelling portions of the sensor space or portions of the data structure, respectively, may be used to determine a loss that may be based at least in part on a difference between the ground truth data and the object detection determined by the object detection component. This loss may be backpropagated through the object detection component and the encoder, altering parameter(s) thereof, to reduce the loss according to gradient descent. The object detection component may be removed after training is complete, e.g., when the average loss of the last n losses is below a threshold loss, a number of epochs or batches is complete, or the losses otherwise indicate diminishing returns, and the encoder may be used to determine the feature representation(s) discussed herein.

Either form of training may functionally result in training the encoder to generate an embedding that is located within an embedding space that differentiates the input sensor data from other sensor data of a same or different type. An embedding may include a vector representation or tensor representation of the input data in a high-dimensional space called an embedding space, although the dimensionality of that space may be lower than the original input data. Note that this embedding space may be high-dimensional compared to two- or three-dimensions (e.g., hundreds of dimensions or thousands of dimensions), but may have less or even far less dimensions than the input data, which may number in the thousands or millions of dimensions. With training, an encoder differentiates between data by locating embeddings at different locations in the embedding space to signify their relative similarities, differences, attributes, etc.

In some examples, the machine-learned model may comprise a transformer-based encoder that may apply self-attention to a single type of sensor data or an encoder that applies cross-attention between multiple types of sensor data to determine the feature representation. The encoder may also determine a set of preliminary embeddings using a first type of sensor data by applying one or more layers of self-attention to the first sensor data and may generate a set of (final) embeddings by applying cross-attention between the set of preliminary perception embeddings and a set of preliminary embeddings associated with a different type of sensor data. In some examples, generating the set of (final) embeddings may comprise an iterative process of self-attention on the last set of preliminary perception embeddings and cross-attending the resulting self-attended preliminary embeddings with embeddings generated for other sensor data and repeating using the cross-attended result. See U.S. patent application Ser. No. 18/304,975, filed Apr. 21, 2023 and U.S. patent application Ser. No. 18/127,480, filed Mar. 28, 2023, the entireties of which is incorporated herein for all purposes, for examples of self-attention and cross-attention.

In some examples, the techniques described herein may comprise other machine-learned model(s) for determining a depth estimate associated with sensor data, which may include computer vision machine-learned model(s) such as a neural network (e.g., U-net), vision-based transformer (e.g., ViT), or the like; machine-learned model(s) for aggregating feature representation(s) for a particular voxel or for a part of the exterior portion of the data structure (e.g., a neural network, multi-layer perceptron, transformer-based machine-learned model), and/or others.

In some examples, further training may be conducted on the encoder(s) for generating the feature representation(s) and the subsequent machine-learned model(s), such as the machine-learned model(s) for determining a depth estimate, object detection and/or tracking component(s), machine-learned model(s) for aggregating feature representation(s), and/or the like. This further training may comprise end-to-end training or training that comprises freezing part(s) of the pipeline, such as by freezing (preventing alteration(s) to parameter(s) of) the encoder(s) as the training is conducted or for particular stages of the training. For example, all the machine-learned model(s) may be trained for the first p batches of training data, whereas for the subsequent batches particular component(s) may be frozen, where p is a positive integer. Regardless, this training may include determining a loss based at least in part on a difference between an object detection and/or track indicated in the data structure discussed herein and a ground truth object detection and/or track that indicates portions of the data structure discussed herein that are occupied by an object and/or characteristic(s) of that object (e.g., position, orientation, velocity, acceleration, classification, and/or the like at a point in time or over time). In some examples, the ground truth object data may be generated using human and/or perception component-generated labels of the data structure.

By generating the data structure and feature representation(s) therein from the sensor data, the techniques discussed herein may reduce the sensitivity of the vehicle to changes in a particular sensor model used and/or to state changes in a sensor, such as sensor degradation, damage, or interference caused by environmental conditions (e.g., night, fog, electromagnetic interference). Additionally, the techniques discussed herein may improve the accuracy and smoothness of object detection and tracking, particularly for objects close enough and/or large enough to be indicated partially in two or more sensors' sensor data, which may cause multiple object detections to be generated for a single object and/or for the object detection(s) to flicker, distort, fail to be generated, or to otherwise be inaccurate. The techniques may even allow the vehicle to continue to accurately detect and track objects when one or two sensors are completely unavailable (e.g., due to tampering, degradation, or the like). The techniques may thereby increase the safety and efficacy of a vehicle that generates and uses the data structure discussed herein.

EXAMPLE SCENARIO

FIG. 1 illustrates an example scenario 100 including a vehicle 102. In some examples, the example scenario 100 may be a real-world scenario. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, controller(s) 114, and/or machine-learned model(s) 116. Note that, in some examples, the computing device(s) 106 may additionally or alternatively store a prediction component, map data, logging component, and/or localization component. The prediction component may be part of the perception component 110 and it may determine a predicted position, orientation, velocity, acceleration, and/or other state (e.g., aperture state, blinker state) associated with an object. The logging component may store log data and/or periodically transmit the log data to a remote computing device (illustrated in FIG. 7). The log data may be based at least in part on sensor data received at an autonomous vehicle, perception data generated by a perception component, and/or instructions generated by a planning component. In some examples, at least part of the log data may be used as ground truth data for training the models discussed herein (e.g., perception component outputs may be used as a ground truth label). The localization component may comprise software and/or hardware system(s) for determining a pose (e.g., position and/or orientation) of the vehicle 102 relative to one or more coordinate frames (e.g., relative to the environment, relative to a roadway and/or static object(s) indicated in map data, relative to an inertial direction of movement associated with the autonomous vehicle). The localization component may output at least part of this data to the perception component 110, which may output at least some of the localization data and/or use the localization data as a reference for determining at least some of the perception data. In some examples, the perception data may include the localization data and/or the prediction data.

In general, the perception component 110 may determine what is in the environment surrounding the vehicle 102 and the planning component 112 may determine how to operate the vehicle 102 according to information received from the localization component and/or the perception component 110. The prediction component, the localization component, the perception component 110, and/or the planning component 112 may include one or more machine-learned (ML) models and/or other computer-executable instructions.

In some examples, the localization component and/or the perception component 110 may receive sensor data from the sensor(s) 104. In some examples, the localization component and/or perception component 110 may comprise a pipeline of hardware and/or software, which may include one or more GPU(s), ML model(s), Kalman filter(s), and/or the like. In some instances, the perception component 110 may determine data related to objects in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), map data that identifies characteristics detected in proximity to the vehicle (e.g., locations and/or dimensions of the roadway, roadway classification(s) (e.g., directionality associated with a portion of the roadway, crosswalk locations, controlled intersection type, signage type and location), buildings, trees, fences, fire hydrants, and any other feature detectable in various sensor modalities), etc.

The perception component 110 may use the sensor data discussed herein to generate the data structure discussed herein. For example, the perception component 110 may use image data (e.g., visible light data, infrared data), lidar data, radar data, and/or the like to generate the data structure. The depicted example includes a depiction of the relative image planes of a set of images 118 received by the vehicle 102 from a set of cameras One or more of these images 118 may comprise an image representation 120 of a pedestrian 122 in an environment associated with the vehicle 102. In some examples, the perception component 110 may additionally or alternatively receive lidar data 124, radar data, and/or any other types of sensor data associated with the pedestrian 122. The perception component 110 may use any of this sensor data and additional or alternate sensor data as part of generating at least part of the data structure discussed herein. The perception component 110 may then use the data structure to determine an object detection associated with the pedestrian, track the pedestrian over time, and/or predict future object data related to the pedestrian.

When a perception component 110 detects an object (e.g., using the data structure discussed herein), the perception component 110 may generate an object detection, which May comprise a further data structure indicating one or more characteristics of the object. For example, the object detection may indicate a region of interest (ROI) associated with the object detection (e.g., a bounding box, mask, or other indication of a portion of sensor data associated with the object); instance segmentation; semantic segmentation; a volume or area occupied by the object; a pose (e.g., position and/or orientation); velocity; acceleration; classification (e.g., vehicle, pedestrian, articulating vehicle, signage); track; confidence score(s) that any such data is accurate; other state (e.g., signage state, such as traffic light state, lane closure state; aperture/door state; passenger loading/unloading object; passenger embarking/disembarking; blinker/emitter state); etc. associated with the object. The perception component 110 may associate an object detection with a track, which may indicate that the object has been previously detected and may comprise historical perception data and/or predicted perception data associated with the object. For example, the track may associate one or more object detections associated with a same object but different times. In some examples, the object track may indicate a current, historical, and/or predicted position, orientation, velocity, acceleration, and/or other state or object detection data (e.g., classification, ROI, confidence score(s)) associated with an object.

In some examples, the perception component 110 may comprise a prediction component that determines predicted data associated with an object, such as a predicted future position, orientation, velocity, acceleration, state, or the like. This predicted data and/or historical data associated with an object may be amalgamated with the current object detection data as a track in association with the object. In some examples, the prediction data may be additionally or alternatively based at least in part on map data or other data. In some examples, the prediction data may comprise a top-down segmentation of the environment, as described in more detail in U.S. Pat. No. 10,649,459, filed Apr. 26, 2018, which is incorporated by reference in its entirety for all purposes herein, and/or a top-down prediction associated with the environment, as described in more detail in U.S. Patent Application Publication No. 2021-0181758, filed Jan. 31, 2020, which is incorporated by reference in its entirety for all purposes herein. In some examples, the prediction data generated by such a prediction component may be part of the perception data.

Additionally or alternatively, the prediction data may be indicated in the data structure discussed herein, either by appending the prediction data to relevant voxel(s) and/or part(s) of the exterior portion of the data structure, or by determining feature representation(s) for the prediction data and concatenating, summing, or determining updated feature representation(s) by a machine-learned model and based at least in part on the former feature representation(s) and the feature representation(s) determined for the prediction data.

The data produced by the perception component 110 may be collectively referred to as "perception data." In some examples, the data structure may be part of the perception data and, in additional or alternate examples, the data structure may comprise object detection(s), track(s), and/or prediction data. In some examples, the perception component 110 may additionally or alternatively indicate a time and/or location associated with the data structure discussed herein, an object detection, and/or other perception data. In some examples, the time associated with an object detection and/or the data structure may be a time or average time at which sensor data used to determine the object detection was generated and a location associated with an object detection may be the position the object is detected as being located at, a center of an ROI associated with the object, or the like.

Once the perception component 110 has generated perception data, the perception component 110 may provide the perception data to the planning component 112. Regardless, in some examples, the data structure may also be provided to the planning component 112. Additionally or alternatively, the perception data may be stored as part of log data transmitted to a remote computing device by a logging component.

The planning component 112 may determine a trajectory 126 based at least in part on the perception data. For example, the planning component 112 may determine a route for the vehicle 102 from a first location to a second location; generate, substantially simultaneously and based at least in part on the perception data, a plurality of candidate trajectories for controlling motion of the vehicle 102 in accordance with a receding horizon technique (e.g., 1 micro-second, half a second, 4 seconds, 8 seconds, and the like) to control the vehicle to traverse the route (e.g., in order to avoid any of the detected objects); and select one or more of the candidate trajectories as a trajectory 126 that the vehicle 102 may use to generate a drive control signal that may be transmitted to drive components of the vehicle 102. In some examples, the trajectory 126 may be part of a series of trajectories determined by a tree search conducted by the planning component 112 based at least in part on the sensor data, perception data, prediction data, map data, and/or data structure discussed herein, as discussed in more detail in U.S. Pat. No. 11,932,282, filed Aug. 4, 2021 and/or U.S. patent application Pub. Ser. No. 18/540,642, filed Dec. 14, 2023, the entireties of which is incorporated by reference herein for all purposes. FIG. 1 depicts an example of such a trajectory 126, represented as an arrow indicating a heading, velocity, and/or acceleration, although the trajectory itself may comprise instructions for controller(s) 114, which may, in turn, actuate a drive system of the vehicle 102.

For example, the planning component 112 may determine a route from a first location to a second location based at least in part on a set an intersection and/or roadway whitelist and/or blacklist. The route may identify the roadway(s), intersection(s), and/or lane(s) that the vehicle may plan to use to reach the second location from the first location. The tree search may iteratively determine different candidate actions as candidates for controlling the vehicle for each time period of a series of time periods. The prediction component (e.g., of the perception component) may determine at least a portion of a predicted trajectory for an object in the environment based at least in part on such a candidate action and the tree search may select a first candidate action associated with a first time period to use to explore further candidate actions stemming from the first candidate action at a second time period, as discussed in more detail in U.S. patent application Ser. No. 18/540,642, filed Dec. 14, 2023, referenced above. In some examples, the portion of the predicted trajectory may comprise a response of the object to the candidate action since some candidate actions for controlling the vehicle may affect an operation of the object. In some examples, a cost may be determined by a cost function for each candidate action based at least in part on the predicted trajectory of the object. The prediction component may update the predicted trajectory and/or add a new portion to the predicted trajectory of an object that was determined for the first candidate action based at least in part on one of the candidate actions determined for the second time step. The tree search may repeat this process until a time horizon, distance, or target pose is achieved by the tree search. The tree search may also account for objects classified by the perception component 110 as not being relevant to operation planning by the vehicle (e.g., a machine-learned model may have generated a likelihood of such object(s) changing their behavior responsive to a candidate action of the vehicle that is below a likelihood threshold), but may use a passive prediction for those objects. In some examples, the passive prediction may be determined by the tree search using a kinematics model or neural network. However, such a passive prediction would not be based on the candidate action(s) of the vehicle.

In some examples, the machine-learned model(s) 116 discussed herein may comprise encoder(s) for determining the feature representation(s) discussed herein, machine-learned model(s) for determining aggregated or updated feature representation(s) using feature representation(s) as input, and/or computer vision machine-learned model(s) for determining a depth estimate and/or probability distribution associated with a portion of sensor data, such as a pixel, voxel, or context window/context volume of sensor data.

FIG. 1 depicts an example of a trajectory 126, represented as an arrow indicating a position, heading, velocity, and/or acceleration, although the trajectory itself may comprise instructions for a controller, which may, in turn, actuate a drive system of the vehicle 102. For example, the trajectory 126 may comprise instructions for controller(s) 114 of the autonomous vehicle 102 to actuate drive components of the vehicle 102 to effectuate a steering angle and/or steering rate, which may result in a vehicle position, vehicle orientation, vehicle velocity, and/or vehicle acceleration (. The trajectory 126 may comprise a target heading, target steering angle, target steering rate, target position, target velocity, and/or target acceleration for the controller(s) to track over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the controller(s) 114 may comprise software and/or hardware for actuating drive components of the vehicle 102 sufficient to track the trajectory 126. For example, the controller(s) 114 may comprise one or more proportional-integral-derivative (PID), linear quadratic regulator (LQR), model predictive control (MPC), and/or other controller(s) to control vehicle 102 to track trajectory 126.

EXAMPLE ENCODER ARCHITECTURE AND PROCESS

Figure 2:
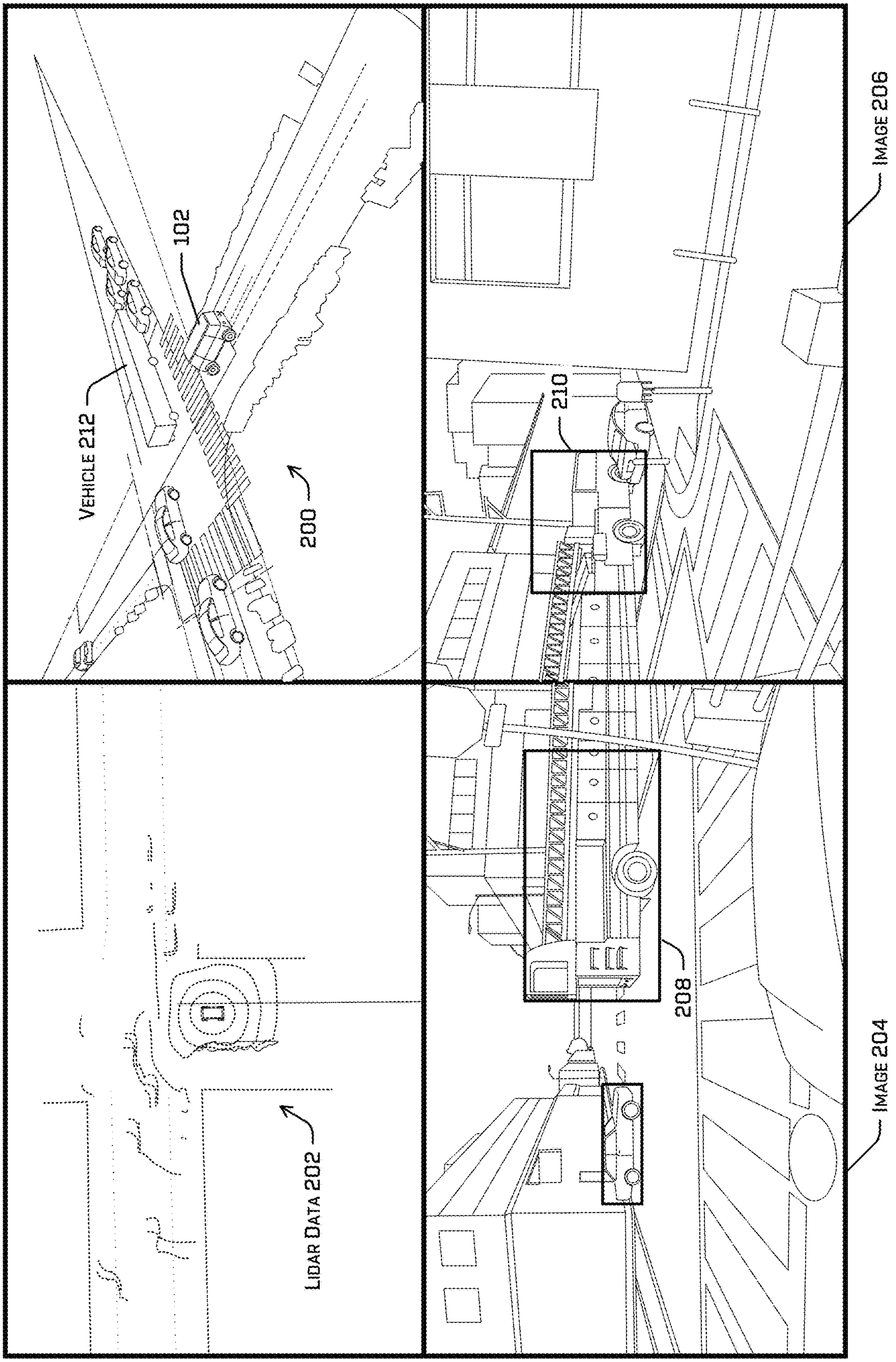
FIG. 2 illustrates an example scenario and different examples of at least part of the sensor data that may be collected during the example scenario.

FIG. 2 illustrates an example scenario 200 and different examples of at least part of the sensor data that may be collected during the example scenario. FIG. 2 also includes an illustration of example object detections generated using the raw sensor data. For example, the upper left representation of the example scenario 200 includes lidar data received by the vehicle 102. The bottom left and right may represent an image 204 and an image 206 received by the vehicle 102 during the example scenario. For example, image 204 may be received by a first camera and the image 206 may be received by a second camera at substantially the same time (e.g., within a threshold time, e.g., 1 millisecond or less, 5 milliseconds or less). The lidar data 202, the image 204, and the image 206 may all indicate sensor data associated with vehicle 212, which may be an oversized vehicle, such as a fire truck, among other objects in the environment. In the depicted example, the vehicle 212 is large enough and/or close enough to the vehicle 102 that the vehicle 212 appears in both image 204 and image 206. This may be problematic for object detection components, particularly for the example shown where only part of the vehicle 212 is depicted in image 204 and image 206, respectively. For example, a first object detection 208 determined from the image 204 may have a different size than a second object detection 210 determined from the image 206, and the first object detection 208 and/or second object detection 210 may fail to classify part of each image as being attributed to the vehicle 212. Note that the depicted example is exaggerated to demonstrate. The techniques described herein comprising using the data structure to generate object detection(s), object track(s), and/or object prediction(s) may overcome this problem and may improve the overall accuracy of such detection(s), track(s), and/or prediction(s).

EXAMPLE DATA STRUCTURES

Figure 3B:
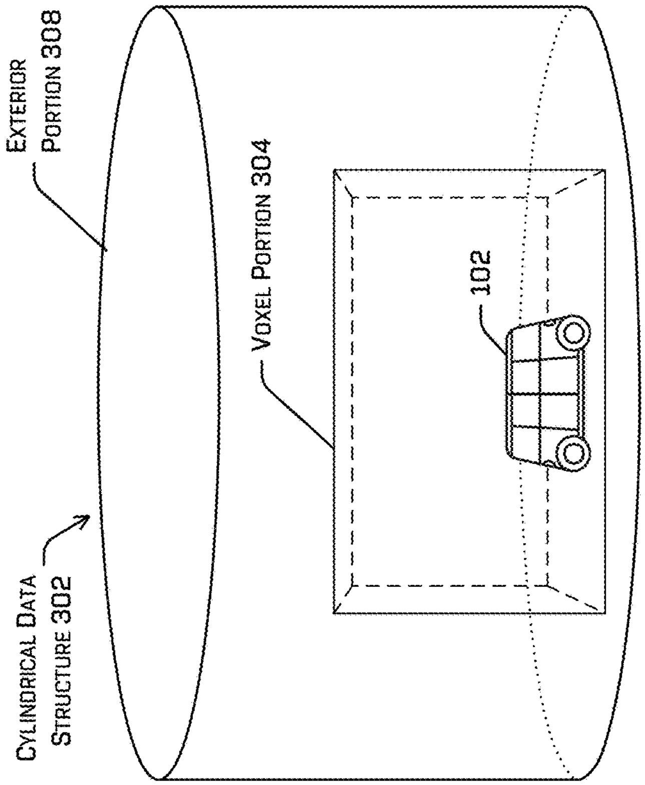
FIG. 3B illustrates a representative architecture of an example cylindrical data structure for fusing sensor data received from two or more sensors, the example cylindrical data structure comprising a voxel grid portion and a cylindrical exterior portion.
Figure 3A:
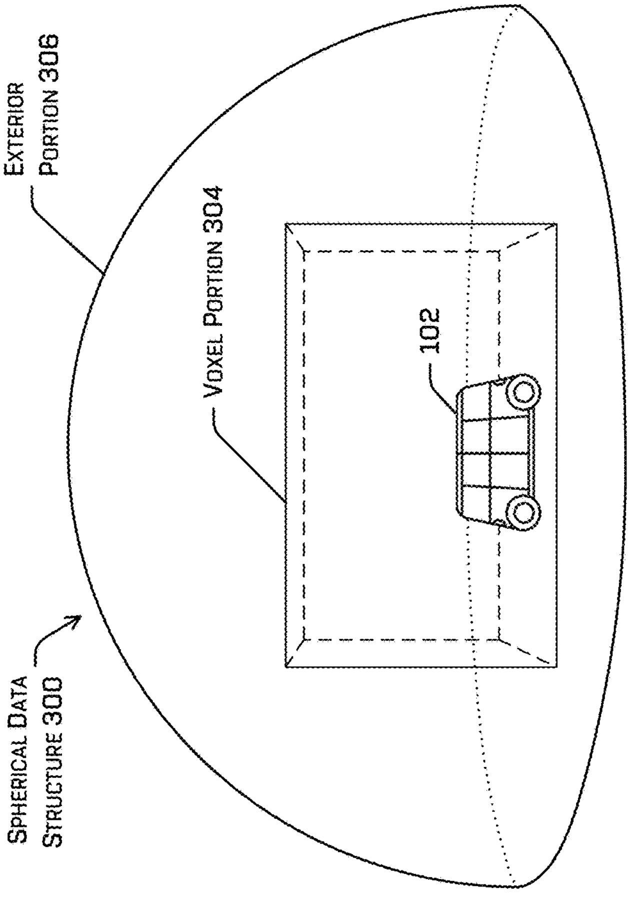
FIG. 3A illustrates a representative architecture of an example spherical data structure for fusing sensor data received from two or more sensors, the example spherical data structure comprising a voxel grid portion and a spherical exterior portion.

FIG. 3A illustrates a representative architecture of an example spherical data structure 300 for fusing sensor data received from two or more sensors, the example spherical data structure comprising a voxel grid portion and a spherical exterior portion. FIG. 3B illustrates a representative architecture of an example cylindrical data structure 302 for fusing sensor data received from two or more sensors, the example cylindrical data structure comprising a voxel grid portion and a cylindrical exterior portion.

Both data structure architectures and any other potential data structures using differently shaped exterior portions may comprise a voxel portion 304. The voxel portion 304 may comprise a voxel grid having a volume defined by a square, rectangle, polygon, or the like and having boundaries containing voxels. For example, the voxel grid's volume may be bounded by cuboid having sides that are 50 or 75 meters from the front, back, and sides of the vehicle and that extends 10 meters above a ground plane determined by the vehicle or as indicated by map data and may comprise individual voxels defined as Cartesian cubes, polar cubes (e.g., cube defined by a depth range, a height range, and a yaw angle range), and/or the like. Note that FIGS. 3A and 3B not to scale, but that they depict boundaries of the vehicle grid as a cuboid. Further note that these dimensions are merely given as examples and any other dimensions could be used. The voxel grid may comprise a plurality of voxels (not depicted so that vehicle 102 is visible in the illustration), where a voxel may indicate a portion of space around the vehicle that is contained by the voxel grid. For example, a voxel may have dimensions defining a cube, cuboid, triangular prism, square-based pyramid, tetrahedron, or the like portion of the voxel grid and a corresponding portion of the environment surrounding the vehicle.

Beyond the voxel portion 304, the data structure may indicate feature representations of sensor data using an exterior portion, which may be defined by a sphere, cylinder, triangle, square-based pyramid, tetrahedron, or the like, and/or a coordinate system associated therewith. For example, FIG. 3A depicts a spherical exterior portion 306 where a feature representation associated with part of the spherical exterior portion may be associated with polar coordinates or a range of polar coordinates and FIG. 3B depicts a cylindrical exterior portion 308 where a feature representation with part of the cylindrical exterior portion may be associated with cylindrical coordinates or a range of cylindrical coordinates. In some examples, although the exterior portion 306 of the spherical data structure 300 and the exterior portion 308 of the cylindrical data structure 302 are depicted using a constant radius, the radius may be infinite, undefined i.e., the exterior portion of any data structure may indicate a feature representation for any data in a particular direction, regardless of how far away from the sensor position any object(s) are that are indicated in the sensor data. Additionally or alternatively, the exterior portion of the data structure discussed herein may have a constant radius. For example, the radius may be defined to be a distance that meets or exceeds a maximum range of a sensor, such as the type of sensor having a longest range from among multiple sensor types.

As discussed further herein, a feature representation may be determined for a voxel of the voxel portion 304 based at least in part on sensor data that is within a threshold distance of a ray that intersects the voxel. Determining this feature representation may comprise determining a final feature representation from multiple feature representations generated for different types of sensor data (e.g., image, lidar, and radar to give a non-limiting example), feature representations for other voxels near enough the voxel that the voxel is included in a set of voxels with which a feature representation is to be associated, and/or the like. Determining the feature representation for a part of the exterior portion, such as a pixel or other region, may comprise determining feature representation(s) of the voxel portion 304 and/or feature representation(s) of sensor data laying beyond a border of the voxel portion 304 that are within a threshold distance of a ray intersecting the part of the exterior portion. These feature representations may be aggregated according to the techniques discussed herein.

Figure 3C:
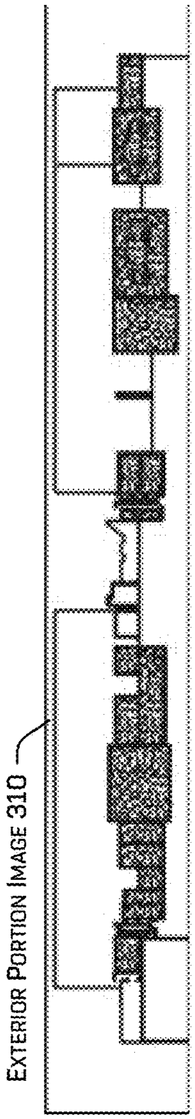
FIG. 3C illustrates an example of unfolded image data from a cylindrical exterior portion.

FIG. 3C illustrates an example of unfolded image data from a cylindrical exterior portion of the cylindrical data structure 302. In some examples, the exterior portion may be represented as an image (i.e., exterior portion image 310), where a pixel or a group of pixels stores an aggregated feature representation determined from feature representation(s) of the voxel grid and/or feature representation(s) determined for sensor data outside the voxel grid (or for which no depth estimate was determined, available, or used) that are within a threshold distance of one or more rays that intersect the part of the exterior portion. Although exterior portion image 310 appears to depict a somewhat humanly recognizable pattern depicting an environment, the feature representations discussed herein may comprise embedding(s) and, as such, the resultant image is not a traditional RGB or grayscale, image, since a pixel or group of pixels may indicate one or more embeddings. Note that an image of the cylindrical data structure 302 was easiest to depict as an image, but that the exterior portion 306 of the spherical data structure may similarly be represented by projecting the sphere into a two-dimensional space. Additionally or alternatively, if the sphere is to be projected into a two-dimensional rectangle, some portions of the resultant image may indicate nonce data (e.g., zero, empty) to indicate portions that are not included in the sphere.

EXAMPLE RAY TRACING TECHNIQUE FOR GENERATING THE VOXEL GRID AND/OR EXTERIOR PORTION OF THE DATA STRUCTURE

Figure 4:
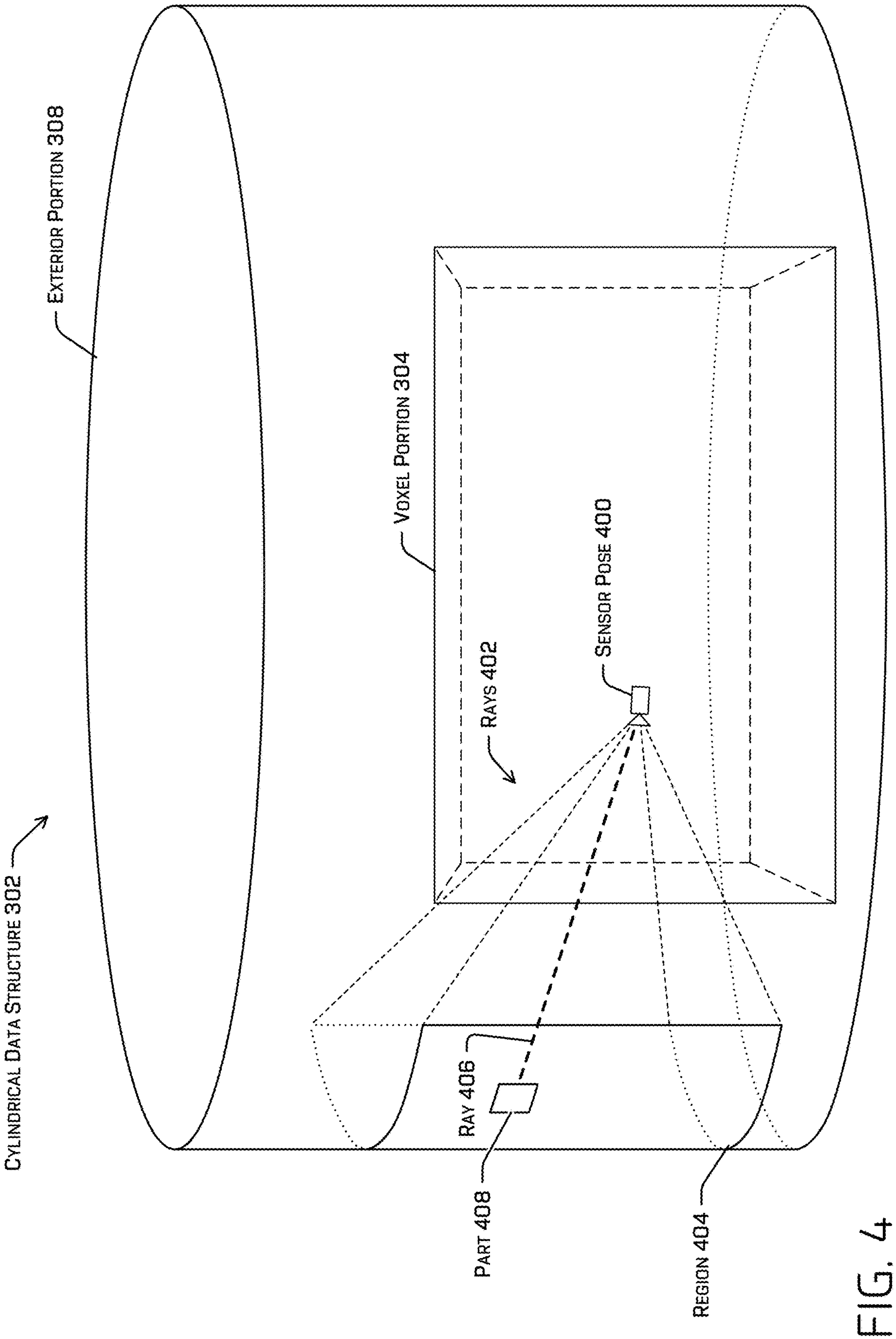
FIG. 4 illustrates a representative architecture of the data structure and a depiction of an example process for generating the data structure, the example cylindrical data structure comprising a voxel grid portion and a cylindrical exterior portion and generating the example cylindrical data structure comprising ray tracing bounded by a sensor frustrum.

FIG. 4 illustrates a representative architecture and depiction of an example process for generating an example cylindrical data structure, the example cylindrical data structure 302 comprising a voxel grid portion 304 and a cylindrical exterior portion 308. In some examples, generating the data structure discussed herein, regardless of the shape and/or coordinate system of the exterior portion, may comprising generating a set of rays for up to each sensor associated with the vehicle. Generating the set of rays for a sensor may comprise ray tracing bounded by a sensor frustrum and based at least in part on a sensor pose 400 of the sensor, which may indicate a position and/or orientation of the sensor. For example, FIG. 4 illustrates rays 402 that may be generated based at least in part on ray tracing using the sensor pose 400 and characteristics of the sensor, including a frustum of the sensor to bound a yaw range and height range or yaw range and pitch range rays may be generated. In the illustration, the depicted sensor may be a camera having a rectangular-based frustum, as indicated by the rectangular region 404 (considered rectangular based on a rectangular frustum's projection into the cylindrical space) of the exterior portion 308 of the data structure onto which an image received from the camera can be mapped at its boundaries.

Figure 5:
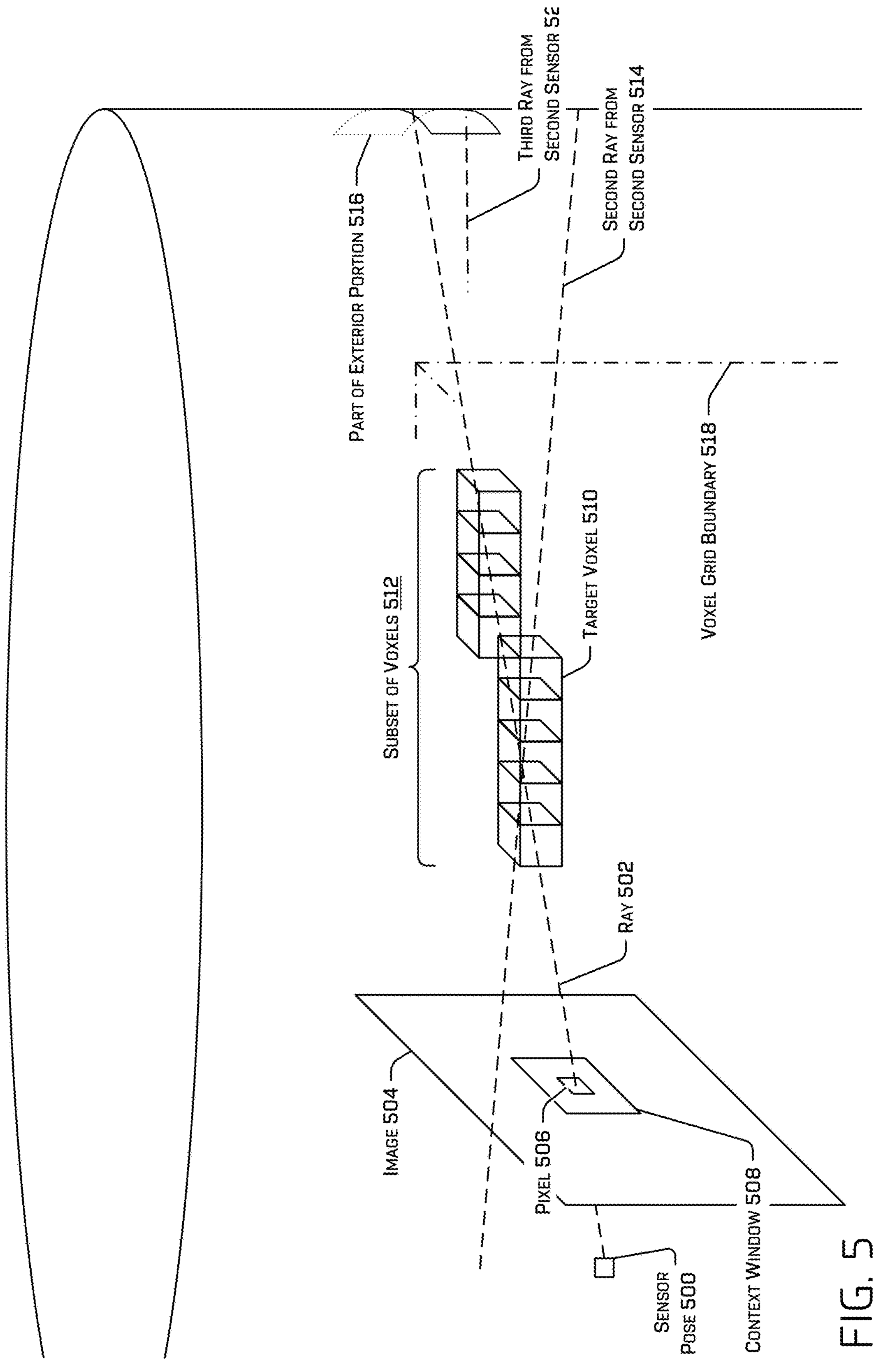
FIG. 5 illustrates a representative architecture and depiction of an example process for generating an example cylindrical data structure, the example cylindrical data structure comprising a voxel grid portion and a cylindrical exterior portion.

Although FIG. 4 depicts five rays (one for each corner of the frustum and one example ray 406) for clarity of the drawing, any number of rays or density of rays (rays per square meter, for example) may be ray traced within the frustum of the sensor and originating from the pose of the sensor. A ray, such as ray 406, may be used to determine a subset of voxels of the voxel grid and/or a part 408 of the exterior portion 308 of the data structure that the ray intersects and/or that are within a threshold distance of the ray (e.g., 10 centimeters, 1 meter tangent to the ray). In some examples, the part 408 may be a pixel, group of pixels, or other region of the exterior portion 308 (e.g., which may be defined by a yaw angle and height or range of yaw angles and range of heights for a cylindrical exterior portion, or a yaw angle and pitch angle or yaw angle range and pitch angle range for a spherical exterior portion). Note that the subset of voxels associated with a particular ray, such as ray 406, are not depicted in FIG. 4 for the sake of clarity of the illustration, but FIG. 5 depicts an example subset of voxels.

A ray generated from the ray tracing and the subset of voxels and/or the part 408 of the exterior portion 308 that are intersected by the ray or within a threshold distance of the ray may be precomputed and transmitted to the autonomous vehicle for storage by the autonomous vehicle. In some examples, the ray tracing may be a pre-processing operation that may occur once for a particular configuration of the vehicle and that may be updated if a sensor pose is changed or capabilities of the sensor are changed that affect a frustum of the sensor (e.g., such as by changing sensor models or changing sensor parameters).

Note that an aggregated feature representation associated with the part 408 of the exterior portion 308 may be determined based at least in part on any sensor data that lies outside the voxel portion 304, sensor data for which no feature representation has been generated so far, and/or feature representations in the voxel portion 304 that lie along ray 406 or within a threshold distance of ray 406 since the ray 406 intersects the part 408. The aggregated feature representation associated with the part 408 may additionally be based on any such feature representation(s) associated with one or more other rays emanating from one or more additional sensors and that also intersect the part 408.

EXAMPLE ARCHITECTURE FOR PRE-TRAINING AGGREGATING ENCODER

FIG. 5 illustrates part of an example architecture of a data structure that may be generated according to the techniques discussed herein, and a depiction of an example process for generating part of that data structure. The portion of the example cylindrical data structure depicted may comprise a voxel grid portion and a cylindrical exterior portion of the data structure. Generating the data structure may comprise receiving an indication of a sensor's pose, i.e., sensor pose 500 (i.e., position and orientation), and retrieving, from a memory, a ray 502 associated with the sensor pose 500 or determining the ray 502 based at least in part on a ray tracing process that may be based at least in part on the sensor pose 500 and a frustum of the sensor. In the depicted example, the sensor may be a camera that may have generated an image 504.

Generating the data structure may comprise determining a portion of the image 504 intersected by the ray 502. For example, the portion may comprise a pixel 506 and/or a context window 508 surrounding the pixel 506. In some examples, the context window may be a subset of pixels of the image 504 surrounding the pixel 506, such as pixel(s) within a predetermined rectangle or square surrounding the pixel 506. The portion of the image (e.g., the pixel 506 and/or context window 508) intersected by the ray may be used to determine a feature representation for populating a subset of voxels of the voxel grid and/or a part of an exterior portion of the data structure.

Generating the data structure may additionally or alternatively comprise generating feature representation(s) to populate a voxel grid portion of the data structure and/or an exterior portion of the data structure. To determine feature vector(s) for a voxel of the voxel grid, the techniques may comprise determining a set of voxels of the voxel grid intersected by the ray. This determination may be accomplished on vehicle or may be predetermined and retrieved from memory.

A machine-learned model (e.g., an encoder such as a transformer-based encoder or neural network) may determine a first feature representation to associate with a voxel intersected by the ray 502 based at least in part on sensor data associated with the portion of the image 504 that is also intersected by the ray 502. In some examples, the first feature representation may be associated with the entire set of voxels the ray 502 intersects. In an additional or alternate example, the first feature representation may be associated with a target voxel 510.

In some examples, the target voxel 510 may be associated with a depth indicated by the sensor data intersected by the ray 502. In an example where the sensor data is lidar data, for example, determining the portion of the lidar data associated with the ray 502 may comprise determining a subset of lidar data that indicates lidar returns within a threshold distance of the ray 502 (e.g., lidar points that have a tangent distance ray 502 that is less than a threshold distance). The average distance from the sensor indicated by this subset of lidar points may be used as the estimated distance for determining the target voxel 510. A similar process may be used for radar data, ToF data, sonar data, and/or the like. In an example where the sensor data is an image lacking depth information (e.g., a monocular image), an estimated depth for the portion of the sensor data intersected by the ray 502 may comprise providing the image 504 or at least the context window 508 as input to a machine-learned model trained to determine estimated depth(s) (i.e., distance(s) from the sensor) associated with the image 504, the context window 508, or the pixel 506. Additionally or alternatively, two or more images may be used by a machine-learned model or a stereo image determined by a stereo camera may be used to determine the estimated depth. In some examples, a machine-learned model may additionally or alternatively determine a confidence interval or probability distribution associated with an estimated depth, however the estimated depth is determined.

In some examples, the manner in which the depth estimate is determined may depend on environmental conditions detected by one or more sensors. For example, at night, lidar data may be used to determine the depth estimate for image data closer to a set of cameras than during the daytime, when lidar data may be used to determine depth estimates further from the cameras. For distances below this threshold distance, a machine-learned model may be used to determine estimated depths associated with image data.

Regardless of how the estimated distance is determined, the techniques may comprise determining the target voxel 510 based at least in part on determining the voxel that is at the estimated depth from the sensor position along the ray. In some examples, the feature representation may be associated with at least this voxel, a subset of voxels within a threshold distance of the voxel that are also intersected by the ray and/or within a threshold distance of the ray, a subset of voxels having a probability or confidence indicated by the probability or confidence interval associated with the estimated depth that meets or exceeds a threshold probability or confidence, or all the voxels intersected by the ray or within a threshold distance of the ray.

In the depicted example, the first feature representation may be associated with voxels having a probability or confidence that meets or exceeds a threshold probability or threshold confidence, i.e., the subset of voxels 512. In such an example, the first feature representation and, in additional or alternate examples, the probability or confidence interval may be associated with each of the voxels of the subset of voxels 512.

For sensor types like lidar and radar, the lidar data and/or radar data may be projected into the voxel grid and a second feature representation may be determined for the lidar data and/or radar data contained within a voxel. That second feature representation may be further associated with the voxel. Note that, in an additional or alternate example, the sensor data associated with a voxel, no matter the type of sensor data, may be determined and the sensor data determined to be associated with a particular voxel may be used by a machine-learned model trained to generate a feature representation using multiple types of sensor data may determine a feature representation to associate with the voxel. Additionally or alternatively, after feature representations have been determined for each type of sensor data, multiple feature representations may be associated with a same voxel, such as due to multiple types of sensor data and/or multiple subsets of sensor data have being mapped (e.g., determined as being related to) to the voxel according to the techniques discussed above (e.g., the voxel is a target voxel associated with a depth estimate, the voxel is within another voxel's probability distribution—i.e., the voxel has a probability or confidence that meets or exceeds a threshold probability or confidence, the voxel is within another voxel's confidence interval, the voxel contains lidar and/or radar data). In such an example, these feature representations may be concatenated to each other, summed, averaged, or a machine-learned model (e.g., a neural network, self-attention layer(s) and/or cross attention layer(s), a multi-layer perceptron) may determine a final feature representation to associate with the voxel using the feature representations associated with the voxel as input.

For example, the target voxel 510 is intersected by both the ray 502 and a second ray from a second sensor 514. In such an example, the techniques may end up determining to associate a first feature representation based at least in part on the pixel 506 and/or context window 508 with the target voxel 510 and a second feature representation determined for a portion of sensor data generated by the second sensor determined to be associated with the target voxel 510. In such an example, the first feature representation and the second feature representation may be concatenated together, summed, averaged, or used as input to the additional machine-learned model that determines a final feature representation to associate with the target voxel 510.

In some examples, a subset of voxel(s) associated with a ray that lie beyond a depth estimate may be indicated as being occluded. This occlusion indication may comprise a text tag that may be associated with the subset of voxels or a vector that may be appended to a voxel's feature representation(s). Such a vector may indicate an identifier of the sensor and a preset value or value(s) indicating occlusion (e.g., it can be any number or group of numbers that may be used as an indication of occlusion).

Generating the data structure may additionally or alternatively comprise determining that the ray 502 intersects part of the exterior portion 516 of the data structure. In some examples, the exterior portion of the data structure may be limited to indicating feature representations generated for only any sensor data that lies beyond a voxel grid boundary 518 and/or sensor data for which no depth estimate was determined or for which the system is not designed to generate a depth estimate. In additional or alternate examples, the exterior portion of the data structure may indicate aggregated feature representations generated for the sensor data that lies beyond the voxel grid boundary 518, sensor data for which no depth estimate was determined, and based on the feature representations indicated by a set of voxels that are intersected by ray(s) that also intersect a part of the exterior portion.

Additionally or alternatively, a part of the exterior portion 516 of the data structure may indicate an aggregated feature representation determined using a set of feature representations associated with ray(s) that intersect the part of the exterior portion 516, regardless of what the voxel contains. In some examples, the exterior portion may comprise multiple such portions indicating different aggregated features and, in some examples, the exterior portion may be a sparse representation in that not every part of the exterior portion 516 may have at least one ray that intersects the portion. Accordingly, the exterior portion 516 may have predetermined parts that may indicate a nonce value, such as 0 or a vector of zeroes. These parts may be predetermined based on the ray casting and may be updated if a shift in sensor pose is detected.

For example, determining the feature representation to associate with part of the exterior portion 516 of the data structure may comprise determining a set of rays that intersect the part of the exterior portion 516. The part of the exterior portion may be a region of the exterior portion that may be designed to be as small, the rays numerous enough, and the voxels small enough that each part (e.g., region) of the exterior portion 516 is intersected by a single ray; however, in some examples, the part of the exterior portion may be large enough that multiple rays intersect such a part. Moreover, the part of the exterior portion may be defined to have an undefined depth and may accordingly be defined as a height and range of yaw angles (for a cylindrical exterior portion), a range of pitch angles and a range of yaw angles (for a spherical exterior portion), etc. Additionally or alternatively, the part of the exterior portion may be defined to have a depth that is determined based at least in part on sensor data indicating an environmental condition (e.g., the existence, of fog, snow, rain), a maximum effective range of any of the sensors, or a combination thereof (e.g., a maximum effective range of any of the sensors in a particular environmental condition).

Regardless, determining the aggregated feature representation for the part of the exterior portion 516 may comprise determining a set of sensor data that is intersected by or within a threshold distance of each ray of the set of rays intersecting the part of the exterior portion 516. In the depicted example, the part of the exterior portion 516 is intersected by at least ray 502 and a third ray from the second sensor 520 (only a portion of which is depicted to preserve clarity of the drawing). As discussed above, although the exterior portion is depicted as having a constant radius, the set of sensor data may be determined by projecting the sensor data received by the vehicle into a cylindrical space (for the depicted example, although other coordinate systems may be used for the exterior portion) and determining a set of the sensor data that maps onto the part of the exterior portion 516 (e.g., sensor data within a yaw angle range and height range defining the part of the exterior portion 516, in an example where a cylindrical exterior portion is used with an infinite or undefined radius). Feature representation(s) may be determined for any sensor data of the set located beyond the voxel grid boundaries and/or for which no feature representation has been determined by the machine-learned model trained to generate feature representations of that sensor data type (whether a single machine-learned model or multiple machine-learned models). Once these feature representation(s) have been generated the feature representation(s) may be associated with the part of the exterior portion 516 (e.g., by concatenation, summation, averaging, or fusing by a machine-learned model that determines a final feature representation using multiple feature representations as input).

Additionally or alternatively, in an example where a subset of the voxel grid's feature representations is indicated by the part of the exterior portion, the feature representation(s) determined for the set of sensor data associated with the part of the exterior portion 516 and lying beyond the voxel grid boundaries and/or that otherwise haven't had a feature representation determined therefor, and any feature representations indicated by voxels intersected by the set of rays or within a threshold distance of the set of rays may be concatenated, summed, averaged, or fused by a machine-learned model that determines a final feature representation using multiple feature representations.

In an additional or alternate example, the aggregated feature representation determined for a part of the exterior portion may be determined based at least in part on any sensor data along ray(s) that intersect the part. Additionally or alternatively, the aggregated feature representation may be determined by cross-attending feature representations determined for the sensor data of any ray(s) intersecting the part and feature representations indicated associated with voxel(s) intersected by such ray(s). In such an example, the cross-attention output may be the aggregated feature representation associated with the part of the exterior portion, or the cross-attention output may be processed by a feed-forward neural network to determine the aggregated feature representation.

This process may be repeated for up to each ray and, depending on the ray density, voxel size, and/or part size, some voxel(s) and/or part(s) may be left unpopulated by feature representation(s). In such an example, these may be filled with nonce data (e.g., zero, empty) or feature representations may be determined for these voxel(s) and/or part(s) by cross-attending, self-attending, or determining by a neural network or other machine-learned model a set of feature representations indicated by voxel(s) or part(s), respectively, within a threshold of the empty voxel(s) and/or part(s). In examples where some voxel(s) and/or part(s) are filled with nonce data instead, the precomputation of the rays may predetermine a set of voxel(s) and/or part(s) for which no operations need to occur and this set of voxel(s) and/or part(s) may be pre-filled with nonce data to reduce computational processing.

The resultant data structure may be used by other machine-learned model(s) to determine an object detection, object track, and/or object prediction, as discussed below in further detail. In some examples, an object detection, track, or prediction that is subsequently generated using the data structure discussed herein may be associated with the voxel(s) and/or part(s) of the exterior portion occupied by the object detection, track, or prediction, which may be determined by projecting the object detection, track, or prediction into the voxel grid and/or exterior portion, respectively. The raw object detection, track, or prediction data may be associated with the voxel(s) and/or part(s) onto which such data is mapped, such as by appending a pointer to a storage location or message associated with the object detection, track, or prediction to the voxel(s) and/or part(s), or by determining a feature representation of the object detection, track, or prediction and concatenating, summing, averaging, or fusing (by a machine-learned model as discussed above) the object detection, track, or prediction feature representation with feature representation(s) indicated by the voxel(s) and/or part(s) onto which the object detection, track, or prediction were mapped.

EXAMPLE PROCESS FOR GENERATING AND USING THE DATA STRUCTURE ENCODING SENSOR DATA

Figure 6:
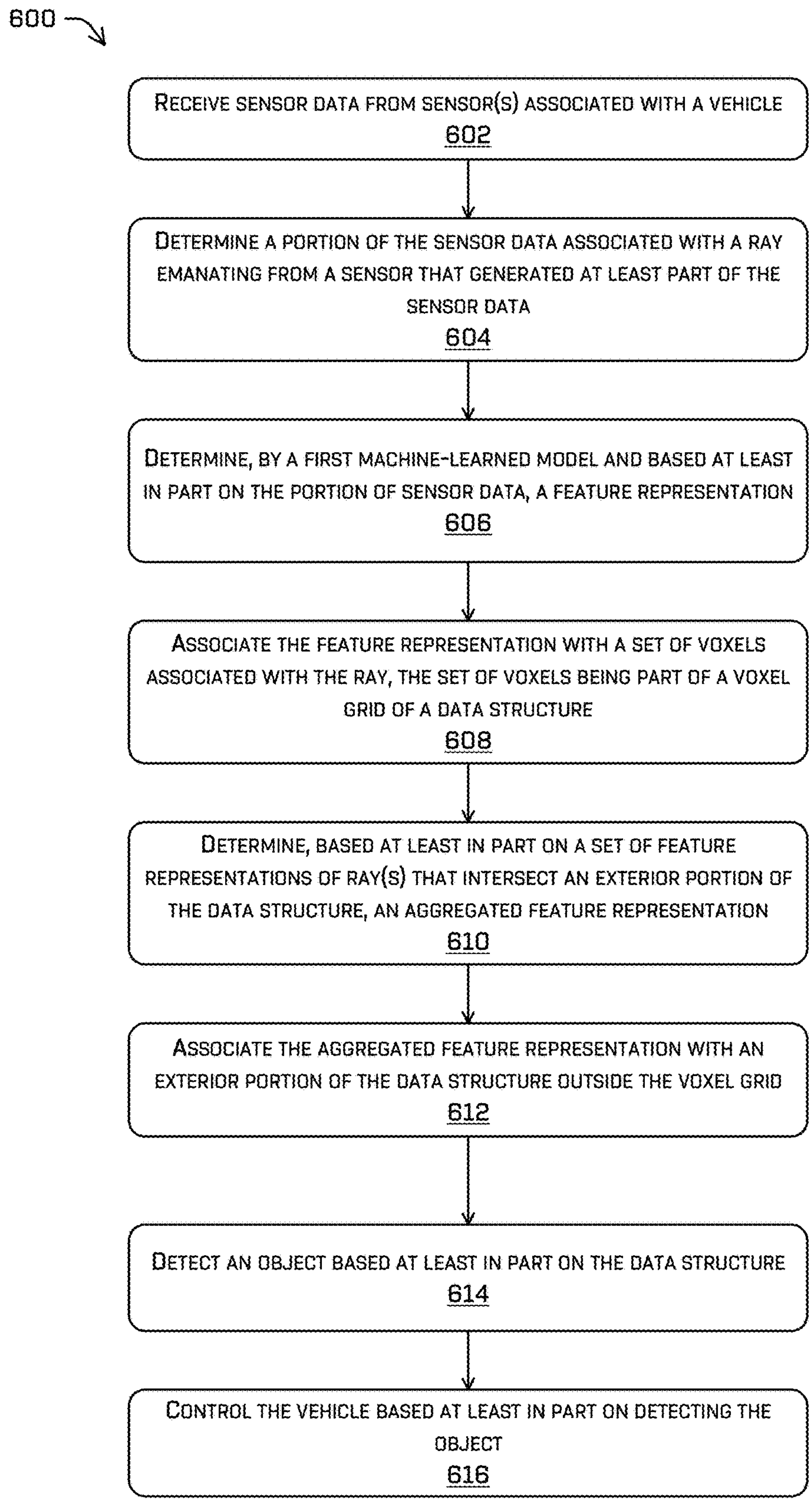
FIG. 6 illustrates a flow diagram of an example process for generating a data structure as described herein that may be used for object detection and/or tracking.

FIG. 6 illustrates a flow diagram of an example process 600 for generating a data structure as described herein that may be used for object detection, tracking, and/or prediction and/or vehicle control. The operations in the process 600 may be executed in parallel, separately, in series, and/or performed by the same device or different devices. For example, the operations can be implemented by a computing device of a vehicle 102 and/or remote computing device(s) 714. In some examples, example process 600 may additionally or alternatively comprise a precomputation comprising determining a set of rays for each sensor of the vehicle for which sensor data is to be represented in the data structure. This may comprise a ray casting operation that is based on a sensor's pose and bounded by the sensor's frustum. Additionally or alternatively, the precomputation may comprise determining voxel(s) and/or part(s) of an exterior portion of the data structure that are associated with each ray, such as by determining the voxel(s) and/or part(s) that are intersected by a ray or that are within a threshold tangent distance of the ray.

At operation 602, example process 600 may comprise receiving sensor data from sensor(s) associated with a vehicle, according to any of the techniques discussed herein. For example, the sensor data may be received from two or more sensors and the sensors may be different types/modalities of sensors (e.g., visible light camera, infrared camera, monocular camera, stereo camera, lidar, radar, ToF).

At operation 604, example process 600 may comprise determining a portion of the sensor data associated with a ray emanating from a sensor that generated at least part of the sensor data, according to any of the techniques discussed herein. For example, operation 604 may comprise determining a subset of a set of sensor data received from a sensor, wherein determining the subset of sensor data comprises determining that the subset of the sensor data is intersected by the ray or is within a threshold distance of the ray. To give a practical, non-limiting, example, for an image, this may comprise determining a pixel that is intersected by a ray and/or determining a context window of pixels surrounding the pixel. For three-dimensional data, like lidar data, radar data, a stereo image, or the like, this may comprise determining sensor data intersected by the ray or determining a volume surrounding the ray (based on the threshold distance) and determining the sensor data contained within the volume. Additionally or alternatively, determining the subset of data for three-dimensional data may comprise a subset of sensor data contained by a voxel that is intersected by and/or within a threshold distance of the ray.

At operation 606, example process 600 may comprise determining, by a first machine-learned model and based at least in part on the subset of sensor data, a feature representation, according to any of the techniques discussed herein. In some examples, operation 606 may comprise determining the feature representation based at least in part on a portion of the subset of sensor data associated with the ray, wherein the portion is associated with a voxel or set of voxels determined at operation 608. In some examples, the machine-learned model may be an encoder, such as a transformer-based encoder that uses self-attention and/or cross-attention to determine the feature representation, a neural network, a multi-layer perceptron, or the like. In some examples, the feature representation may be an embedding or another feature representation, such as a field.

At operation 608, example process 600 may comprise associating the feature representation with a set of voxels associated with the ray, the set of voxels being part of a voxel grid of a data structure, according to any of the techniques discussed herein. For example, the set may comprise a voxel that contains the sensor data intersected by the ray and/or within a threshold distance of the ray. Additionally or alternatively, the voxel may be determined based at least in part on a depth estimate determined for the portion of sensor data by a machine-learned model, wherein the voxel is located at a distance along the ray corresponding to the depth estimate. The set may additionally or alternatively include other voxels, such voxels within a confidence interval associated with the depth estimate, within the threshold distance of the ray or within a threshold distance of the first voxel, or having a probability that meets or exceeds a threshold probability (where the confidence interval determined based at least in part on or the probability distribution was generated by a machine-learned model in association with the depth estimate). In some examples, where multiple feature representations have been determined to be associated with a voxel, the multiple feature representations may be concatenated, summed, averaged, or fused into a single feature representation by a machine-learned model that determines a final feature representation using multiple feature representations as input. In some examples, the final feature representation may be stored at the voxel.

At operation 610, example process 600 may comprise determining, based at least in part on a set of feature representations of ray(s) that intersect an exterior portion of the data structure, an aggregated feature representation, according to any of the techniques discussed herein. Operation 610 may comprise determining a first set of feature representation(s) associated with voxels intersected by a ray that intersects the exterior portion of the data structure and/or within a threshold distance of the ray, and, in some examples, may additionally or alternatively comprise determining a second set of feature representation(s) for any sensor data intersected by the ray or within a threshold distance of the ray either for which no feature representation has been determined so far (e.g., sensor data that lies beyond a boundary of the voxel grid, sensor data for which no depth estimate was determined) or any sensor data intersected by the ray or within a threshold distance of the ray. The aggregated feature representation may be determined by concatenating, summing, averaging, or fusing the first and second sets of feature representations (e.g., by a machine-learned model that determines a final feature representation using multiple feature representations as input, by a machine-learned model that cross-attends the first and second sets of feature representations).

At operation 612, example process 600 may comprise associating the aggregated feature representation with an exterior portion of the data structure outside the voxel grid, according to any of the techniques discussed herein. In some examples, operation 612 may comprise determining one or more rays that intersect a region of the exterior portion of the data structure. In some examples, the region may be defined by two of three coordinates of a spherical, cylindrical, triangular, or other shaped space. For example, in a spherical space, the region of the exterior portion may be defined by a yaw angle range and a pitch angle range; whereas, for a cylindrical space, the region may be defined by a yaw angle range and a height range. Operation 612 may comprise determining a set of aggregated feature representations associated with the one or more rays that intersect the part/region of the exterior portion. This set of aggregated feature representations may be concatenated, summed, averaged, or fused into a single aggregated feature representation by a machine-learned model that may be associated with the region of the exterior portion. For example, the final aggregated feature representation may be stored at a pixel or group of pixels in the region/part of the exterior portion. Ultimately, then the data structure may comprise feature representations associated with different voxels of the voxel grid and final aggregated feature representations associated with different parts of the exterior portion of the data structure. As discussed above, the exterior portion may be sparsely populated, in that final aggregated feature representations may be associated with a subset of the total parts/regions of the exterior portion of the data structure. Additionally or alternatively, another machine-learned model may determine which regions of the data structure to populate based at least in part on the aggregated feature representations determined for the different rays.

At operation 614, example process 600 may comprise detecting an object, tracking the object, and/or predicting a future state of the object based at least in part on the data structure, according to any of the techniques discussed herein. For example, operation 614 may comprise determining the object detection, track, and/or prediction by a machine-learned model trained to use the data structure as input. This machine-learned model may be trained to use the data structure as input and may output an indication of a region of the data structure associated with an object or a future state of the object (e.g., a portion of the voxel grid and/or a region of the exterior portion associated with the object); a softmaxed output of a velocity, acceleration, yaw rate, and/or the like associated with a current and/or future state of the object; previous state(s) associated with the object (e.g., previous portion(s) of the voxel grid and/or region(s) of the exterior portion associated with the object; and/or the like. Note that the softmaxed output may be used such that the machine-learned model may output an estimated or predicted velocity, or the like in association with up to each voxel of the voxel grid and/or region of the exterior portion, and that the softmax function may limit the output to only those velocity(ies), that satisfy the softmax function's conditions, thereby preventing every voxel and/or region to have a velocity, or the like associated therewith and just indicating velocity(ies), or the like in association with those voxel(s) and/or region(s) of the exterior portion that are associated with object(s). In some examples, the machine-learned model may comprise a first machine-learned model that uses the voxel feature representations as input to determine a first output and a second machine-learned model that uses the final aggregated feature representations as input to determine a second output. The machine-learned model may further comprise a feed-forward neural network, multi-layer perceptron, or Kolmogorov-Arnold network that uses the first output and the second output to determine the object detection, track, and/or prediction.

This machine-learned model may be trained based at least in part on human labelling of the data structure or machine-learned model labelling of the data structure (e.g., such as by a machine-learned model that may be too computationally intensive with contemporary hardware to run on the vehicle). Training the machine-learned model may comprise determining a loss (e.g., L1, L2, Cauchy, Huber, contrastive) based at least in part on a difference between the labeled data structure and the object detection, track, and/or prediction output by the machine-learned model. This loss may be determined for differences in the exterior portion and may be backpropagated through the model(s) that determine aggregated feature representations, feature representations for the external portion, feature representations for the voxel grid, and so on. This backpropagation may comprise altering one or more parameters of any of these models to reduce the loss, according to gradient descent.

At operation 616, example process 600 may comprise controlling the vehicle based at least in part on the object detection, track, and/or prediction, according to any of the techniques discussed herein.

EXAMPLE ARCHITECTURE

Figure 7:
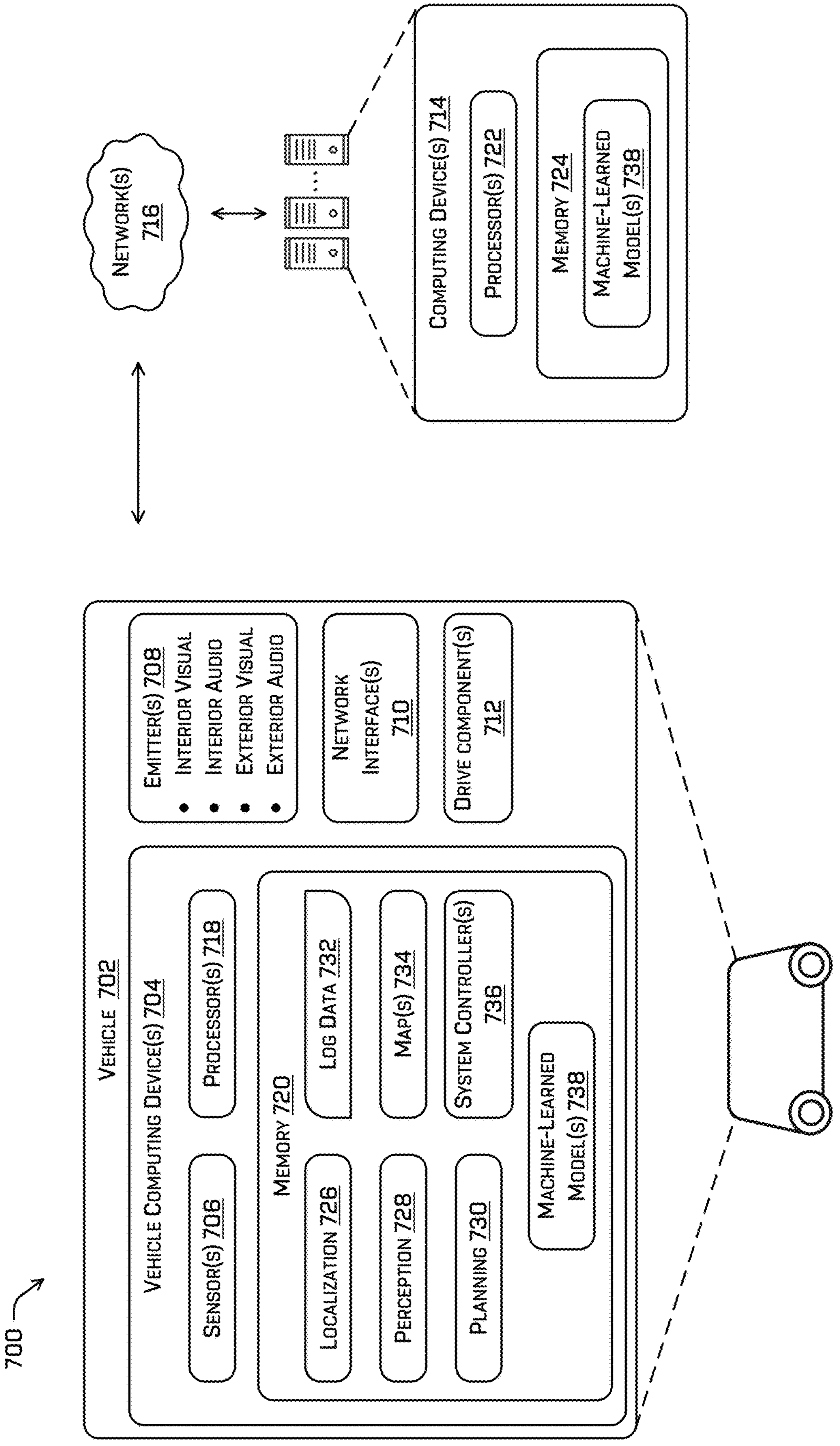
FIG. 7 illustrates an example architecture comprising a perception component and/or machine-learned model(s) for generating the data structure discussed herein.

FIG. 7 illustrates a block diagram of an example system 700 that implements the techniques discussed herein. In some instances, the example system 700 may include a vehicle 702, which may represent the vehicle 102 in FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include a vehicle computing device(s) 704, sensor(s) 706, emitter(s) 708, network interface(s) 710, and/or drive component(s) 712. Vehicle computing device(s) 704 may represent computing device(s) 106 and sensor(s) 706 may represent sensor(s) 104. The system 700 may additionally or alternatively comprise computing device(s) 714.

In some instances, the sensor(s) 706 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 714. The position and orientation (i.e., pose), field of view, and operational capabilities of a sensor may define a frustum associated with a sensor that may be used to bound the ray casting techniques discussed herein.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive component(s) 712. Also, the network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 714. In some examples, computing device(s) 714 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 716. For example, the network interface(s) 710 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G, 4G LTE, 5G), or any suitable wired or wireless communications protocol that enables the respective computing device to interface with the other computing device(s). In some instances, the vehicle computing device(s) 704 and/or the sensor(s) 706 may send sensor data, via the network(s) 716, to the computing device(s) 714 at a particular frequency, after a lapse of a predetermined period of time, in near real-time, etc.

In some instances, the vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 718 and memory 720 communicatively coupled with the one or more processors 718. Memory 720 may represent memory 108. Computing device(s) 714 may also include processor(s) 722, and/or memory 724. The processor(s) 718 and/or 722 may be any suitable processor capable of executing instructions to process data and perform operations as described herein. By way of example and not limitation, the processor(s) 718 and/or 722 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 720 and/or 724 may be examples of non-transitory computer-readable media that may store processor-executable instructions. The memory 720 and/or 724 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 720 and/or memory 724 may store a localization component 726, perception component 728, planning component 730, log data 732, map data 734, system controller(s) 736, and/or machine-learned model(s) 738—zero or more portions of any of which may be hardware, such as GPU(s), CPU(s), and/or other processing units. Perception component 728 may represent perception component 110, planning component 730 may represent planning component 112, system controller(s) 736 may represent controller(s) 114, and/or machine-learned model(s) 738 may represent machine-learned model 116.

In at least one example, the localization component 726 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 726 may include and/or request/receive map(s) of an environment, such as map data 734, and can continuously determine a location, velocity, and/or orientation of the autonomous vehicle within the map(s). In some instances, the localization component 726 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 726 may determine localization and/or mapping data comprising a pose graph (e.g., a sequence of position(s) and/or orientation(s) (i.e., pose(s)) of the vehicle 702 in space and/or time, factors identifying attributes of the relations therebetween, and/or trajectories of the vehicle for accomplishing those pose(s)), pose data, environment map including a detected static object and/or its distance from a pose of the vehicle 702, and/or the like In some instances, the localization component 726 may provide data to various components of the vehicle 702 to determine an initial position of an autonomous vehicle for generating a trajectory and/or for generating map data. In some examples, localization component 726 may provide, to the perception component 728 and/or planning component 730 a location and/or orientation of the vehicle 702 relative to the environment and/or sensor data associated therewith.

In some instances, perception component 728 may comprise a perception system and/or a prediction system implemented in hardware and/or software. The perception component 728 may determine the data structure discussed herein and may use it to detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 728 may include a prediction component that predicts actions/states of dynamic components of the environment, such as moving objects, although the prediction component may be separate, as in the illustration. In some examples, the perception component 728 may determine a top-down representation of the environment that encodes the position(s), orientation(s), velocity (ies), acceleration(s), and/or other states of the objects and/or map data in the environment. For example, the top-down representation may be an image with additional data embedded therein, such as where various pixel channel values encode the perception data and/or map data discussed herein. Data determined by the perception component 728 is referred to as perception data.

The prediction component (of the perception component 728 or as an entirely separate component) may predict a future state of an object in the environment surrounding the vehicle 702. The future (predicted) state may indicate a predicted object position, orientation, velocity, acceleration, and/or other state (e.g., door state, turning state, intent state such as signaling turn) of a detected object. Data determined by the prediction component is referred to as prediction data and may be part of the perception data. In some examples, the prediction component may determine a top-down representation of a predicted future state of the environment. For example, the top-down representation may be an image with additional data embedded therein, such as where various channel pixel values encode the prediction data discussed herein.

In some examples, the prediction component may comprise the machine-learned model(s) 738, such as where the machine-learned model(s) 738 includes a multi-layer perceptron or neural network for predicting a future state of an object using one or more aggregated embeddings determined by the encoder and aggregation layer discussed herein.

The planning component 730 may receive a location and/or orientation of the vehicle 702 from the localization component 726 and/or perception data from the perception component 728 and may determine instructions for controlling operation of the vehicle 702 based at least in part on any of this data. In some examples, the memory 720 may further store map data 734 and this map data may be retrieved by the planning component 730 as part of generating environment state data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 712)) that the drive component(s) 712 may parse/cause to be carried out, second instructions for the emitter(s) 708 may be formatted according to a second format associated therewith).

In some examples, the log data 732 may comprise sensor data, perception data, prediction data (which may be part of the perception data), planning data, map data, and/or scenario data collected/determined by the vehicle 702 (e.g., by the perception component 728), as well as any other message generated and or sent by the vehicle 702 during operation including, but not limited to, control messages, error messages, etc. In some examples, the vehicle 702 may transmit the log data 732 to the computing device(s) 714.

In some examples, the map data 734 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 702; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

In some examples, the machine-learned model(s) 738 may comprise at least an encoder for determining a feature representation from a single type of sensor data or from multiple types of sensor data and/or an aggregation machine-learned model for determining a feature representation from multiple feature representations. In some examples, the machine-learned model(s) 738 may be trained on the remote computing device(s) 714 and transmitted to the vehicle 702. During pre-training the machine-learned model(s) 738 may further comprise a training decoder (when ground truth data is unavailable or isn't used) and/or an object detection component. For example, the machine-learned model(s) 738 may comprise a transformer-based machine-learned model or at least the encoder of a transformer-based machine-learned model, or a neural network for determining the feature representation(s) and/or depth estimate discussed herein. For example, the encoder(s) and decoder(s) discussed herein may form a transformer. For example, the encoder(s) and/or decoder(s) may have an architecture similar to visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like. Additionally or alternatively, the machine-learned model(s) 738 may comprise one or more neural network architectures, such as U-net; VQGAN, which combines an autoregressive transformer with convolutional network components (or any other generative adversarial network (GAN); CLIP (which can be used to enhance sensor data learning with natural language supervision); VQGAN and CLIP used together; Metric3Dv2; GCNDepth; AFNet; DistDepth; CLIP2Depth; or the like. The aggregation machine-learned model may comprise a machine-learned model such as a multi-layer perceptron, neural network, or transformer-based machine-learned model, such as a set of self-attention and/or cross-attention layer(s).

The machine-learned model(s) 738 may be pre-trained at computing device(s) 714 based at least in part on initial training data that is part of the log data 732. During this pre-training, the machine-learned model(s) 738 may comprise at least an encoder and a training decoder for the purposes of reconstruction training. During pre-training of the machine-learned model(s) 738, a training decoder may be appended to the encoder and/or aggregation layer of the machine-learned model(s) 738 to complete the transformer architecture. This training decoder may receive an embedding generated by the encoder and/or aggregation layer by virtue of being appended to/associated with the machine-learned model(s) 738. During this pre-training stage, this decoder is trained to estimate a reproduction or reconstruction of the original data that was provided to the encoder of the machine-learned model(s) 738 for the last training iteration.

For example, a training decoder may determine an estimate of the input data using an aggregated embedding generated by the encoder and the aggregation layer. The estimated input may be the training decoder's attempt to reconstruct the original data input to the encoder. As discussed herein, the difference between the estimate output by the training decoder and the original data input to the encoder may be used to determine, by a loss function (e.g., L1 loss, L2 loss, contrastive loss, Huber loss, Cauchy loss, squared of the mean-squared error loss), a loss that may be backpropagated through the training decoder, aggregation layer (if there is one), and/or the encoder using gradient descent. For example, this may include altering one or more parameters of any one or more of the training decoder, aggregation layer, and/or the encoder to reduce the loss. In some examples, multiple training decoders may be used-one decoder for the set of embeddings generated by the encoder and one decoder for each of the types of aggregated embeddings determined by the aggregation layer (e.g., one decoder for all time-aggregated embeddings, one decoder for all object-aggregated embeddings, and so on). In such an example, the loss determined for a specific decoder's output may be used to alter parameter(s) of that decoder and not the other decoders, although in additional or alternate examples, a loss determined for the decoder using the set of embeddings straight from the encoder may be aggregated with a loss determined for a decoder that uses aggregated embeddings as input. Additionally or alternatively, whereas a decoder may be trained using the loss determined for that decoder's output, the loss determined for training the encoder may be based at least in part on an aggregation of the loss(es) determined for any or all of the decoders. For example, the loss for the encoder may be a weighted average of the loss(es) determined for the decoder(s)' output. In such an example, a weight associated with a loss determined for a decoder that uses an aggregated embedding as input may be greater than a weight associated with a loss determined for the decoder that uses the raw set of embeddings from the encoder as input.

A parameter altered in the training may comprise a weight, bias, or other parameter of a portion of the respective component. This process may be repeated for multiple instances of input data. Note that this process requires no extra ground truth data—the input data serves as the ground truth data, different from typical training arrangements. Although in additional or alternate example, ground truth data may be used, in which case an object detection component may replace the training decoder discussed above and the loss computed based at least in part on a difference between a ground truth object detection and an object detection output by the object detection machine-learned model using the feature representation(s)/embedding(s) output by the encoder(s). In some examples, the reconstruction stage or pre-training may comprise masking a portion of the input data, such as by filling a portion of the input with nonce data (e.g., 0, removing a portion of the input entirely), which may result in training the training decoder to reconstruct the entire input data, including the masked portion. In some examples, the percentage of the input data that is masked may start at zero or a small percentage and may progressively increase per batch of training data or once the average reconstruction loss per batch is below a threshold loss.

This training functionally results in training the encoder to generate an embedding that is located within an embedding space that differentiates the input map data and/or time-varying data, such as perception data, from other map data and/or time-varying data. An embedding may include a tensor representation of the input data in a high-dimensional space called an embedding space. Note that this embedding space may be high-dimensional compared to two- or three-dimensions (e.g., hundreds of dimensions or thousands of dimensions), but may have less or even far less dimensions than the input data, which may number in the thousands or millions of dimensions. With training, an encoder differentiates between data by locating embeddings at different locations in the embedding space to signify their relative similarities, differences, attributes, etc.

After pre-training is complete, the training decoder (or object detection component) may be disassociated with the machine-learned model(s) 738, such as by removing the training decoder completely, by suppressing provision to the training decoder of the embedding(s) generated by the encoder, or the like. Thereafter, the machine-learned model(s) 738 may comprise at least the encoder(s) (where multiple encoders are used the encoder(s) may further include an aggregation layer, such as a concatenation layer, summation and/or averaging layer, and/or a multi-layer perceptron). Additionally or alternatively, after pre-training, one or more machine-learned components may be appended to the encoder and aggregation layer, such as the perception component. Additionally or alternatively, once the machine-learned model(s) 738 has been pre-trained and/or any additional component(s) have been trained, the encoder and aggregation layer and/or encoder, aggregation layer, and additional machine-learned component(s) may be transmitted to the vehicle 702 for operation on the vehicle 702 as the machine-learned model(s) 738 stored at the vehicle 702. In some examples, before transmission the encoder may be distilled via knowledge distillation techniques.

The memory 720 and/or 724 may additionally or alternatively store a mapping system, a planning system, a ride management system, simulation component, a logging component that aggregates the log data 732 from output(s) of respective components of the vehicle 702, etc.

As described herein, the localization component 726, the perception component 728, the planning component 730, the machine-learned model(s) 738, and/or other components of the system 700 may comprise one or more machine-learned (ML) models. For example, localization component 726, the perception component 728, the planning component 730, and/or the machine-learned model(s) 738 (and components thereof), may each comprise different ML model pipelines. In some examples, an ML model may comprise a neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 720 may additionally or alternatively store one or more system controller(s) 736 (which may be a portion of the drive component(s)), which may be configured to control steering, propulsion, braking, safety, emitters, communication, and other systems of the vehicle 702. These system controller(s) 736 may communicate with and/or control corresponding systems of the drive component(s) 712 and/or other components of the vehicle 702. For example, the planning component 730 may generate instructions based at least in part on perception data generated by the perception component 728 and/or simulated perception data and transmit the instructions to the system controller(s), which may control operation of the vehicle 702 based at least in part on the instructions.

It should be noted that while FIG. 7 is illustrated as a distributed system, in alternative examples, components of the vehicle 702 may be associated with the computing device(s) 714 and/or components of the computing device(s) 714 may be associated with the vehicle 702. That is, the vehicle 702 may perform one or more of the functions associated with the computing device(s) 714, and vice versa.

EXAMPLE CLAUSES

A: A system comprising: one or more processors; and one or more non-transitory memory storing processor-executable instructions that, when executed by the one or more processors, cause the system to perform operations comprising: receiving sensor data from multiple sensors associated with an autonomous vehicle; determining, based at least in part on a line emanating from a first sensor of the multiple sensors, a portion of the sensor data associated with the line; determining, by a machine-learned model and based at least in part on the portion of the sensor data, a feature representation; associating the feature representation with a set of voxels of a voxel grid surrounding the autonomous vehicle and associated with the line, wherein the voxel grid is part of a data structure comprising the voxel grid; determining, based at least in part on a set of feature representations associated with the line, an aggregated feature representation; associating the aggregated feature representation with a region of an exterior portion of the data structure; at least one of determining an object detection, an object track, or a future state of an object based at least in part on the data structure; and controlling the autonomous vehicle based at least in part on at least one of the object detection, the object track, or the future state.

B: The system of paragraph A, wherein: the sensor data comprises image data from a set of cameras and at least one of radar data from a set of radar sensors or lidar data from a set of lidar sensors; the portion of the sensor data comprises at least one of a pixel of the image data, a radar return, or a lidar return; determining the feature representation by the machine-learned model is further based at least in part on context data comprising a subset of the sensor data within a threshold distance of the portion of the sensor data.

C: The system of either paragraph A or B, wherein determining the aggregated feature representation comprises determining, by a second machine-learned model and based at least in part on the set of feature representations associated with the line and a subset of the sensor data that exists beyond a boundary of the voxel grid, the aggregated feature representation.

D: The system of any one of paragraphs A-C, wherein: the aggregated feature representation is further based at least in part on a second subset of sensor data associated with a sensor and a second line that intersects the region; and the region is defined as a range of polar or cylindrical coordinates and an infinite radius, an undefined radius, or a radius equal to or greater than a maximum range of the multiple sensors.

E: The system of any one of paragraphs A-D, wherein a second machine-learned model determines, based at least in part on a set of aggregated feature representations associated with a set of lines, to populate the region with the aggregated feature representation or a final aggregated feature representation determined based at least in part on the aggregated feature representation and a subset of the set of aggregated feature representations.

F: The system of any one of paragraphs A-E, wherein: a second machine-learned model determines at least one of the object detection, the object track, or the future state based at least in part on the data structure; and the second machine-learned model comprises: a third machine-learned model that determines a first output using feature representations associated with at least a portion of the voxel grid; a fourth machine-learned model that determines a second output using the aggregated feature representation associated with the region; and a fifth machine-learned model outputs an object detection, an object track, or the future state using the first output and the second output.

G: The system of any one of paragraphs A-F, wherein: the operations further comprise determining a final feature representation to associate with a first voxel of the set of voxels based at least in part on concatenating, summing, or determining the final feature representation by a second machine-learned model based at least in part on the feature representation and a second feature representation; and at least one of: the second feature representation may be determined based at least in part on a second subset of the sensor data associated with a first type of sensor different from a second type of sensor associated with the portion of the sensor data used to determine the feature representation; the second feature representation may be determined based at least in part on a second portion of the sensor data associated with a second line that intersects the first voxel; or the second feature representation may be determined for a second voxel and wherein the first voxel is within a threshold distance of the second voxel or is within a confidence interval associated with a depth estimate identifying the second voxel.

H: A method comprising: receiving sensor data; determining, based at least in part on a line emanating from a first sensor that generated at least part of the sensor data, a portion of the sensor data associated with the line; determining, by a machine-learned model and based at least in part on the portion of the sensor data, a feature representation; associating the feature representation with a set of voxels of a voxel grid surrounding a vehicle and associated with the line, wherein the voxel grid is part of a data structure; determining, based at least in part on a set of feature representations associated with the line, an aggregated feature representation; associating the aggregated feature representation with a region of an image that is part of the data structure; at least one of determining an object detection, an object track, or a future state of an object based at least in part on the data structure; and controlling the vehicle based at least in part on detecting the object.

I: The method of paragraph H, wherein: the sensor data comprises image data from a set of cameras and at least one of radar data from a set of radar sensors or lidar data from a set of lidar sensors; the portion of the sensor data comprises at least one of a pixel of the image data, a radar return, or a lidar return; determining the feature representation by the machine-learned model is further based at least in part on context data comprising a subset of the sensor data within a threshold distance of the portion of the sensor data.

J: The method of either paragraph H or I, wherein the set of voxels comprises a first voxel or the first voxel and one or more additional voxels, and the method further comprises: determining the set of voxels with which to associate the feature representation based at least in part on: determining a depth estimate associated with the portion of the sensor data; and determining the first voxel is intersected by the line at the depth estimate.

K: The method of paragraph J, wherein the set of voxels comprises the first voxel and the one or more additional voxels, and the method further comprises determining the one or more additional voxels based at least in part on at least one of: determining the one or more additional voxels are intersected by the line or are within a first threshold distance tangent to the line; determining the one or more additional voxels are within a second threshold distance of the first voxel along the line; determining the one or more additional voxels based at least in part on a confidence score associated with the depth estimate; or determining, by a second machine-learned model based at least in part on at least one of the depth estimate or the portion of the sensor data, a probability distribution over a superset of voxels associated with the line; and determining, based at least in part on the probability distribution, that the one or more additional voxels are associated with a probability indicated in the probability distribution that meets or exceeds a threshold probability.

L: The method of either paragraph J or K, wherein determining the depth estimate comprises at least one of: projecting lidar data or radar data into a voxel space and determining a depth indicated by the lidar data or radar data along the line; or determining, by a third machine-learned model based at least in part on the portion of the sensor data, the depth estimate.

M: The method of any one of paragraphs H-L, wherein determining the aggregated feature representation comprises determining, by a second machine-learned model and based at least in part on the set of feature representations associated with the line and a subset of the sensor data that exists beyond a boundary of the voxel grid, the aggregated feature representation.

N: The method of any one of paragraphs H-M, wherein: the aggregated feature representation is further based at least in part on a second subset of sensor data associated with a sensor and a second line that intersects the region; and the region is defined as a range of polar or cylindrical coordinates and an infinite radius, an undefined radius, or a radius equal to or greater than a maximum range of the multiple sensors.

O: The method of any one of paragraphs H-N, wherein a second machine-learned model determines, based at least in part on a set of aggregated feature representations associated with a set of lines, to populate the region with the aggregated feature representation or a final aggregated feature representation determined based at least in part on the aggregated feature representation and a subset of the set of aggregated feature representations.

P: The method of any one of paragraphs H-O, wherein: a second machine-learned model determines at least one of the object detection, the object track, or the future state based at least in part on the data structure; and the second machine-learned model comprises: a third machine-learned model that determines a first output using feature representations associated with at least a portion of the voxel grid; a fourth machine-learned model that determines a second output using the aggregated feature representation associated with the region; and a fifth machine-learned model outputs an object detection, an object track, or the future state using the first output and the second output.

Q: The method of any one of paragraphs H-P, wherein: the method further comprises determining a final feature representation to associate with a first voxel of the set of voxels based at least in part on concatenating, summing, or determining the final feature representation by a second machine-learned model based at least in part on the feature representation and a second feature representation; and at least one of: the second feature representation may be determined based at least in part on a second subset of the sensor data associated with a first type of sensor different from a second type of sensor associated with the portion of the sensor data used to determine the feature representation; the second feature representation may be determined based at least in part on a second portion of the sensor data associated with a second line that intersects the first voxel; or the second feature representation may be determined for a second voxel and wherein the first voxel is within a threshold distance of the second voxel or is within a confidence interval associated with a depth estimate identifying the second voxel.

R: The method of any one of paragraphs H-Q, further comprising altering a set of feature representations to indicate at least one of the object detection, the object track, or the future state, or a second feature representation determined based at least in part on at least one of the object detection, the object track, or the future state, wherein the set of feature representations are associated with a set of voxels indicated based at least in part on detecting the object.

S: One or more non-transitory computer-readable media storing processor-executable instructions that, when executed by one or more processors, perform operations comprising: receiving sensor data; determining, based at least in part on a line emanating from a first sensor that generated at least part of the sensor data, a portion of the sensor data associated with the line; determining, by a machine-learned model and based at least in part on the portion of the sensor data, a feature representation; associating the feature representation with a set of voxels of a voxel grid surrounding a vehicle and associated with the line, wherein the voxel grid is part of a data structure; determining, based at least in part on a set of feature representations associated with the line, an aggregated feature representation; associating the aggregated feature representation with a region of an image that is part of the data structure; at least one of determining an object detection, an object track, or a future state of an object based at least in part on the data structure; and controlling the vehicle based at least in part on detecting the object.

T: The one or more non-transitory computer-readable media of paragraph S, wherein determining the aggregated feature representation comprises determining, by a second machine-learned model and based at least in part on at least one of the set of feature representations, a first subset of the sensor data that exists beyond a boundary of the voxel grid and associated with the line, or a second subset of the sensor data that is associated with a second line, the aggregated feature representation, wherein the line and the second line both intersect the region.

While the example clauses described above are described with respect to one particular implementation, it should be understood that, in the context of this document, the content of the example clauses can also be implemented via a method, device, system, computer-readable medium, and/or another i006Dplementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of item as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory memory storing processor-executable instructions that, when executed by the one or more processors, cause the system to perform operations comprising:

receiving sensor data from multiple sensors associated with an autonomous vehicle;

determining, based at least in part on a line emanating from a first sensor of the multiple sensors, a portion of the sensor data associated with the line;

determining, by a machine-learned model and based at least in part on the portion of the sensor data, a feature representation;

associating the feature representation with a set of voxels of a voxel grid surrounding the autonomous vehicle and associated with the line, wherein the voxel grid is part of a data structure comprising the voxel grid;

determining, based at least in part on a set of feature representations associated with the line, an aggregated feature representation;

associating the aggregated feature representation with a region of an exterior portion of the data structure;

projecting, on the region of the exterior portion of the data structure and using a second machine-learned model, at least one of:

the aggregated feature representation, or a final aggregated feature representation determined based at least in part on the aggregated feature representation and a subset of a set of aggregated feature representations associated with a set of lines;

at least one of determining an object detection, an object track, or a future state of an object based at least in part on the data structure; and controlling the autonomous vehicle based at least in part on at least one of the object detection, the object track, or the future state.

2. The system of claim 1, wherein:

the sensor data comprises image data from a set of cameras and at least one of radar data from a set of radar sensors or lidar data from a set of lidar sensors;

the portion of the sensor data comprises at least one of a pixel of the image data, a radar return, or a lidar return; and determining the feature representation by the machine-learned model is further based at least in part on context data comprising a subset of the sensor data within a threshold distance of the portion of the sensor data.

3. The system of claim 1, wherein determining the aggregated feature representation comprises determining, by the second machine-learned model and based at least in part on the set of feature representations associated with the line and a subset of the sensor data that exists beyond a boundary of the voxel grid, the aggregated feature representation.

4. The system of claim 1, wherein:

the aggregated feature representation is further based at least in part on a second subset of sensor data associated with a sensor and a second line that intersects the region; and the region is defined as a range of polar or cylindrical coordinates and an infinite radius, an undefined radius, or a radius equal to or greater than a maximum range of the multiple sensors.

5. The system of claim 1, wherein:

the second machine-learned model determines at least one of the object detection, the object track, or the future state based at least in part on the data structure; and the second machine-learned model comprises:

a third machine-learned model that determines a first output using feature representations associated with at least a portion of the voxel grid;

a fourth machine-learned model that determines a second output using the aggregated feature representation associated with the region; and a fifth machine-learned model that outputs the object detection, the object track, or the future state using the first output and the second output.

6. The system of claim 1, wherein:

the operations further comprise determining a final feature representation to associate with a first voxel of the set of voxels based at least in part on concatenating, summing, or determining the final feature representation by the second machine-learned model based at least in part on the feature representation and a second feature representation; and at least one of:

the second feature representation may be determined based at least in part on a second subset of the sensor data associated with a first type of sensor different from a second type of sensor associated with the portion of the sensor data used to determine the feature representation;

the second feature representation may be determined based at least in part on a second portion of the sensor data associated with a second line that intersects the first voxel; or the second feature representation may be determined for a second voxel and wherein the first voxel is within a threshold distance of the second voxel or is within a confidence interval associated with a depth estimate identifying the second voxel.

7. The system of claim 1, wherein:

the voxel grid comprises a previously-defined boundary which is relative to the vehicle and defines the exterior portion and a subset of a space associated with the data structure;

the subset of the space is a portion described by voxels of the voxel grid;

the exterior portion is outside the subset of the space and is described by indexed aggregated representations based on the portion described by voxels; and a subset of sensor data that exists beyond the previously-defined boundary comprises first information distinct from second information, the second information based at least in part on a second subset of sensor data that exists within the previously-defined boundary.

8. A method comprising:

receiving sensor data;

determining, based at least in part on a line emanating from a first sensor that generated at least part of the sensor data, a portion of the sensor data associated with the line;

determining, by a machine-learned model and based at least in part on the portion of the sensor data, a feature representation;

associating the feature representation with a set of voxels of a voxel grid surrounding a vehicle and associated with the line, wherein the voxel grid is part of a data structure;

determining an aggregated feature representation, based at least in part on:

a set of feature representations associated with the line, a subset of the sensor data that exists beyond an outermost boundary of the voxel grid, and using a second machine-learned model to determine the aggregated feature representation;

associating the aggregated feature representation with a region of an image that is part of the data structure and beyond the outermost boundary;

at least one of determining an object detection, an object track, or a future state of an object based at least in part on the data structure; and controlling the vehicle based at least in part on detecting the object.

9. The method of claim 8, wherein:

the sensor data comprises image data from a set of cameras and at least one of radar data from a set of radar sensors or lidar data from a set of lidar sensors;

the portion of the sensor data comprises at least one of a pixel of the image data, a radar return, or a lidar return; and determining the feature representation by the machine-learned model is further based at least in part on context data comprising a subset of the sensor data within a threshold distance of the portion of the sensor data.

10. The method of claim 8, wherein the set of voxels comprises a first voxel or the first voxel and one or more additional voxels, and the method further comprises:

determining the set of voxels with which to associate the feature representation based at least in part on:

determining a depth estimate associated with the portion of the sensor data; and determining the first voxel is intersected by the line at the depth estimate.

11. The method of claim 10, wherein the set of voxels comprises the first voxel and the one or more additional voxels, and the method further comprises determining the one or more additional voxels based at least in part on at least one of:

determining the one or more additional voxels are intersected by the line or are within a first threshold distance tangent to the line;

determining the one or more additional voxels are within a second threshold distance of the first voxel along the line;

determining the one or more additional voxels based at least in part on a confidence score associated with the depth estimate; or determining, by the second machine-learned model based at least in part on at least one of the depth estimate or the portion of the sensor data, a probability distribution over a superset of voxels associated with the line, wherein the one or more additional voxels are associated with a probability indicated in the probability distribution that meets or exceeds a threshold probability.

12. The method of claim 10, wherein determining the depth estimate comprises at least one of:

projecting lidar data or radar data into a voxel space and determining a depth indicated by the lidar data or radar data along the line; or determining, by a third machine-learned model based at least in part on the portion of the sensor data, the depth estimate.

13. The method of claim 8, wherein:

the aggregated feature representation is further based at least in part on a second subset of sensor data associated with a sensor and a second line that intersects the region; and the region is defined as a range of polar or cylindrical coordinates and an infinite radius, an undefined radius, or a radius equal to or greater than a maximum range of multiple sensors associated with the vehicle.

14. The method of claim 8, wherein the second machine-learned model determines, based at least in part on a set of aggregated feature representations associated with a set of lines, to populate the region with the aggregated feature representation or a final aggregated feature representation determined based at least in part on the aggregated feature representation and a subset of the set of aggregated feature representations.

15. The method of claim 8, wherein:

the second machine-learned model determines at least one of the object detection, the object track, or the future state based at least in part on the data structure; and the second machine-learned model comprises:

a third machine-learned model that determines a first output using feature representations associated with at least a portion of the voxel grid;

a fourth machine-learned model that determines a second output using the aggregated feature representation associated with the region; and a fifth machine-learned model that outputs the object detection, the object track, or the future state using the first output and the second output.

16. The method of claim 8, wherein:

the method further comprises determining a final feature representation to associate with a first voxel of the set of voxels based at least in part on concatenating, summing, or determining the final feature representation by the second machine-learned model based at least in part on the feature representation and a second feature representation; and at least one of:

the second feature representation may be determined based at least in part on a second subset of the sensor data associated with a first type of sensor different from a second type of sensor associated with the portion of the sensor data used to determine the feature representation;

the second feature representation may be determined based at least in part on a second portion of the sensor data associated with a second line that intersects the first voxel; or the second feature representation may be determined for a second voxel and wherein the first voxel is within a threshold distance of the second voxel or is within a confidence interval associated with a depth estimate identifying the second voxel.

17. The method of claim 8, further comprising altering a set of feature representations to indicate at least one of the object detection, the object track, or the future state, or a second feature representation determined based at least in part on at least one of the object detection, the object track, or the future state, wherein the set of feature representations are associated with a set of voxels indicated based at least in part on detecting the object.

18. The method of claim 8, wherein:

a first portion of the data structure inside the outermost boundary is associated with a first shape; and a second portion of the data structure outside the outermost boundary is associated with a second shape.

19. One or more non-transitory computer-readable media storing processor-executable instructions that, when executed by one or more processors, perform operations comprising:

receiving sensor data;

determining, based at least in part on a line emanating from a first sensor that generated at least part of the sensor data, a portion of the sensor data associated with the line;

determining, by a machine-learned model and based at least in part on the portion of the sensor data, a feature representation;

associating the feature representation with a set of voxels of a voxel grid surrounding a vehicle and associated with the line, wherein the voxel grid is part of a data structure;

determining an aggregated feature representation, based at least in part on:

a set of feature representations associated with the line, and a second subset of the sensor data, wherein:

the second subset is associated with the first sensor and a second line that intersects a region of an image that is part of the data structure, and the region of the image is defined as a range of polar or cylindrical coordinates and an infinite radius, an undefined radius, or a radius equal to or greater than a maximum range of multiple sensors associated with the sensor data;

associating the aggregated feature representation with the region of the image that is part of the data structure;

at least one of determining an object detection, an object track, or a future state of an object based at least in part on the data structure; and controlling the vehicle based at least in part on detecting the object.

20. The one or more non-transitory computer-readable media of claim 19, wherein determining the aggregated feature representation comprises determining, by a second machine-learned model and based at least in part on at least one of the set of feature representations, a first subset of the sensor data that exists beyond a boundary of the voxel grid and associated with the line, or the second subset of the sensor data that is associated with a second line, the aggregated feature representation, wherein the line and the second line both intersect the region.

* * * * *